US012637112B2

(12) United States Patent
Suo et al.

(10) Patent No.: US 12,637,112 B2
(45) Date of Patent: May 26, 2026

(54) SYSTEMS AND METHODS FOR GENERATING SYNTHETIC MOTION PREDICTIONS

(71) Applicant: Aurora Operations, Inc., Pittsburgh, PA (US)

(72) Inventors: Shun Da Suo, Toronto (CA); Sebastián David Regalado Lozano, Toronto (CA); Sergio Casas, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/676,029

(22) Filed: May 28, 2024

(65) Prior Publication Data

US 2024/0391504 A1 Nov. 28, 2024

Related U.S. Application Data

(63) Continuation of application No. 17/528,577, filed on Nov. 17, 2021, now Pat. No. 12,037,027.
(Continued)

(51) Int. Cl.
*B60W 60/00* (2020.01)
*G06F 18/214* (2023.01)
(Continued)

(52) U.S. Cl.
CPC ... *B60W 60/00276* (2020.02); *G06F 18/2148* (2023.01); *G06N 3/045* (2023.01); *G06V 20/584* (2022.01)

(58) Field of Classification Search
CPC .... G08G 1/0133; G08G 1/0129; G06V 20/54; G06F 18/2415
(Continued)

(56) References Cited

U.S. PATENT DOCUMENTS

2020/0104685 A1   4/2020   Hasenclever et al.
2020/0125902 A1   4/2020   Couse et al.
(Continued)

OTHER PUBLICATIONS

Alahi et al., "Social LTSM: Human Trajectory Prediction in Crowded Spaces", IEEE Conference on Computer Vision and Pattern Recognition, Jun. 27-30, 2016, Las Vegas, Nevada, pp. 961-971.
(Continued)

*Primary Examiner* — Tiffany P Young
(74) *Attorney, Agent, or Firm* — Dority & Manning, P.A.

(57) ABSTRACT

Systems and methods for generating synthetic testing data for autonomous vehicles are provided. A computing system can obtain map data descriptive of an environment and object data descriptive of a plurality of objects within the environment. The computing system can generate context data including deep or latent features extracted from the map and object data by one or more machine-learned models. The computing system can process the context data with a machine-learned model to generate synthetic motion prediction for the plurality of objects. The synthetic motion predictions for the objects can include one or more synthesized states for the objects at future times. The computing system can provide, as an output, synthetic testing data that includes the plurality of synthetic motion predictions for the objects. The synthetic testing data can be used to test an autonomous vehicle control system in a simulation.

20 Claims, 13 Drawing Sheets

Related U.S. Application Data

(60) Provisional application No. 63/114,862, filed on Nov. 17, 2020.

(51) Int. Cl.
    *G06N 3/045*     (2023.01)
    *G06V 20/58*     (2022.01)

(58) Field of Classification Search
    USPC ........................................................ 701/117
    See application file for complete search history.

(56) References Cited

U.S. PATENT DOCUMENTS

2020/0342242 A1* 10/2020 Avidan ................... G06N 3/045
2021/0149022 A1* 5/2021 Kehl ...................... G01S 13/862
2021/0390761 A1* 12/2021 Kowalski .............. G06T 15/205

OTHER PUBLICATIONS

Bansal et al., "ChauffeurNet: Learning to Drive by Imitating the Best and Synthesizing the Worst", arXiv:1812.03079, Dec. 7, 2018, 20 pages.
Behbahani et al., "Learning from Demonstration in the Wild", arXiv:1811.03516v2, Mar. 26, 2019, 9 pages.
Best et al., "Autono Vi-Sim: Autonomous Vehicle Simulation Platform with Weather, Sensing, and Traffic Control", IEEE/CVF Conference on Computer Vision and Pattern Recognition, Jun. 18-23, 2018, Salt Lake City, Utah, pp. 1048-1056.
Bhattacharyya et al., "Modeling Human Driving Behavior through Generative Adversarial Imitation Learning", arXiv:2006.06412, Jun. 10, 2020, 28 pages.
Bhattacharyya et al., "Simulating Emergent Properties of Human Driving Behavior Using Multi-Agent Reward Augmented Imitation Learning", arXiv:1903.05766v1, Mar. 14, 2019, 7 pages.
Bhattacharyya et al., "Multi-Agent Imitation Learning for Driving Simulation", arXiv:1903.05766v1, Mar. 14. 2019, 7 pages.
Bojarski et al., "End to End Learning for Self-Driving Cars", arXiv:1604.07316v1, Apr. 25, 2016, 9 pages.
Brantley et al., "Disagreement-Regularized Imitation Learning", International Conference on Learning Representations, Apr. 30, 2020, Addis Ababa, Ethiopia, pp. 1-16.
Casas et al., "SPAGNN: Spatially-Aware Graph Neural Networks for Relational Behavior Forecasting from Sensor Data" arXiv1910.08233, Oct. 18, 2019, 11 pages.
Casas et al., Implicit Latent Variable Model for Scene-Consistent Motion Forecasting, European Conference on Computer Vision, Aug. 23-29, 2020, pp. 624-641.
Casas et al., "The Importance of Prior Knowledge in Precise Multimodal Prediction", arXiv:2006.0263v1, Jun. 4, 2020, 10 pages.
Casas et al., "IntentNet: Learning to Predict Intention from Raw Sensor Data", Conference on Robot Learning, Oct. 29-31, 2018, Zurich, Switzerland, pp. 947-956.
Chai et al., "MultiPath: Multiple Probabilistic Anchor Trajectory Hypotheses for Behavior Prediction", arXiv:1910.05449v1, Oct. 12, 2019, 14 pages.
Chao et al., "A Survey on Visual Traffic Simulation: Models, Evaluations, and Applications in Autonomous Driving", Computer Graphics Forum, vol. 39, No. 1, 2020, pp. 287-308.
Codevilla et al., "End-to-End Driving via Conditional Imitation Learning", arXiv:1710.02410v2, Mar. 2, 2018, 8 pages.
Cui et al., "Multimodal Trajectory Predictions for Autonomous Driving Using Deep Convolutional Networks", arXiv:1809.10732v2, Mar. 1, 2019, 7 pages.
Djuric et al., "Short-Term Motion Prediction of Traffic Actors for Autonomous Driving Using Deep Convolutional Networks", arXiv:1808.05819v2, Sep. 16, 2018, 7 pages.
Dosovitskiy et al., "CARLA: An Open Urban Driving Simulator", 1st Annual Conference on Robot Learning, Nov. 13-15, 2017, Mountain View, California, 1-16.

Gipps, "A Behavioural Car-Following Model for Computer Simulation", Transportation Research Part B: Methodological, vol. 15, No. 2, 1981, pp. 105-111.
Henaff et al., "Model-Predictive Policy Learning with Uncertainty Regularization for Driving in Dense Traffic", arXiv:1901.02705v1, Jan. 8, 2019, 20 pages.
Higgins et al., "beta-vae: Learning Basic Visual Concepts with a Constrained Variational Framework", International Conference on Learning Representations, Apr. 24-26, 2017, Toulon, France, pp. 1-22.
Ho et al., "Generative Adversarial Imitation Learning", Conference on Neural Information Processing Systems, Dec. 5-10, 2016, Barcelona, Spain, pp. 1-9.
Kesting et al., "Calibrating Car-Following Models by Using Trajectory Data: Methodological Study", arXiv:0803.4063v1, Mar. 28, 2008, 17 pages.
Kesting et al., "General Lane-Changing Model MOBIL for Car-Following Models", Transportation Research Record, vol. 1999, No. 1, 2007, pp. 86-94.
Kesting et al., "Agents for Traffic Simulation", arXiv:0805.0300vl, May 2, 2008, 34 pages.
Kingma et al., "Auto-Encoding Variational Bayes", arXiv: 1312.6114v10, May 1, 2014, 14 pages.
Kong et al., "Kinematic and Dynamic Vehicle Models for Autonomous Driving Control Design", IEEE Intelligent Vehicles Symposium, Jun. 28-Jul. 1, 2015, Seoul, Korea, pp. 1094-1099.
Li et al., "End-to-End Contextual Perception and Prediction with Interaction Transformer", arXiv:2008.05927v1, Aug. 13, 2020, 8 pages.
Lopez et al., "Microscopic Traffic Simulation using SUMO", IEEE International Conference on Intelligent Transportation Systems, Nov. 4-7, 2018, Maul, Hawaii, pp. 2575-2582.
Ma et al., "Arbitrary-Oriented Scene Text Detection via Rotation Proposals", arXiv:1703.01086v3, Mar. 1, 2018, 11 pages.
Manivasagam et al., "LidDARsim: Realistic LiDAR Simulation by Leveraging the Real World", Conference on Computer Vision and Pattern Recognition, Jun. 13-19, 2020, pp. 11167-11176.
Martinez et al., "Bevond Grand Theft Auto V for Training, Testing and Enhancing Deep Learning in Self Driving Cars", arXiv:1712.01397v1, Dec. 4, 2017, 15 pages.
Pomerleau, "AL VINN: An Autonomous Land Vehicle in a Neural Network", Advances in Neural Information Processing Systems, Nov. 30-Dec. 5, 1988, Denver, Colorado, pp. 305-313.
Rhinehart et al., "PRECOG: PREdiction Conditioned on Goals in Visual Multi-Agent Settings", IEEE/CVF International Conference on Computer Vision, Oct. 27-Nov. 3, 2019, Seoul, South Korea pp. 2821-2830.
Ross et al., "A Reduction of Imitation Learning and Structured Prediction to No-Regret Online Learning", International Conference on Artificial Intelligence and Statistics, Apr. 11-13, 2011, Ft. Lauderdale, Florida, pp. 627-635.
Sohn et al., "Learning Structured Output Representation using Deep Conditional Generative Models", Conference on Neural Information Processing Systems, Dec. 7-12, 2015, Montreal, Canada, pp. 3483-3491.
Tang et al., "Multiple Futures Prediction", Conference on Neural Information Processing Systems, Dec. 8-14, 2019, Vancouver, Canada, pp. 1-11.
Treiber et al., "Congested Traffic States in Empirical Observations and Microscopic Simulations", arXiv:cond-mat/0002177v2, Aug. 30, 2000, 47 pages.
Wan et al., "The Unscented Kalman Filter for Nonlinear Estimation", Adaptive Systems for Signal Processing, Communications, and Control Symposium, Oct. 4, 2000, Lake Louise, Canada, pp. 153-158.
Wymann et al., "TORCS: The Open Racing Car Simulator", Mar. 12, 2015.
Yang et al., "PIXOR: Real-Time 3D Object Detection from Point Clouds", Conference on Computer Vision and Pattern Recognition, Jun. 18-22, 2018, Salt Lake City, Utah, pp. 7652-7660.

(56)                    References Cited

OTHER PUBLICATIONS

Yuan et al., "Diverse Trajectory Forecasting with Determinantal
Point Processes", arXiv:1907.04967v2, Dec. 23, 2019, 15 pages.

\* cited by examiner

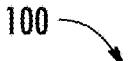
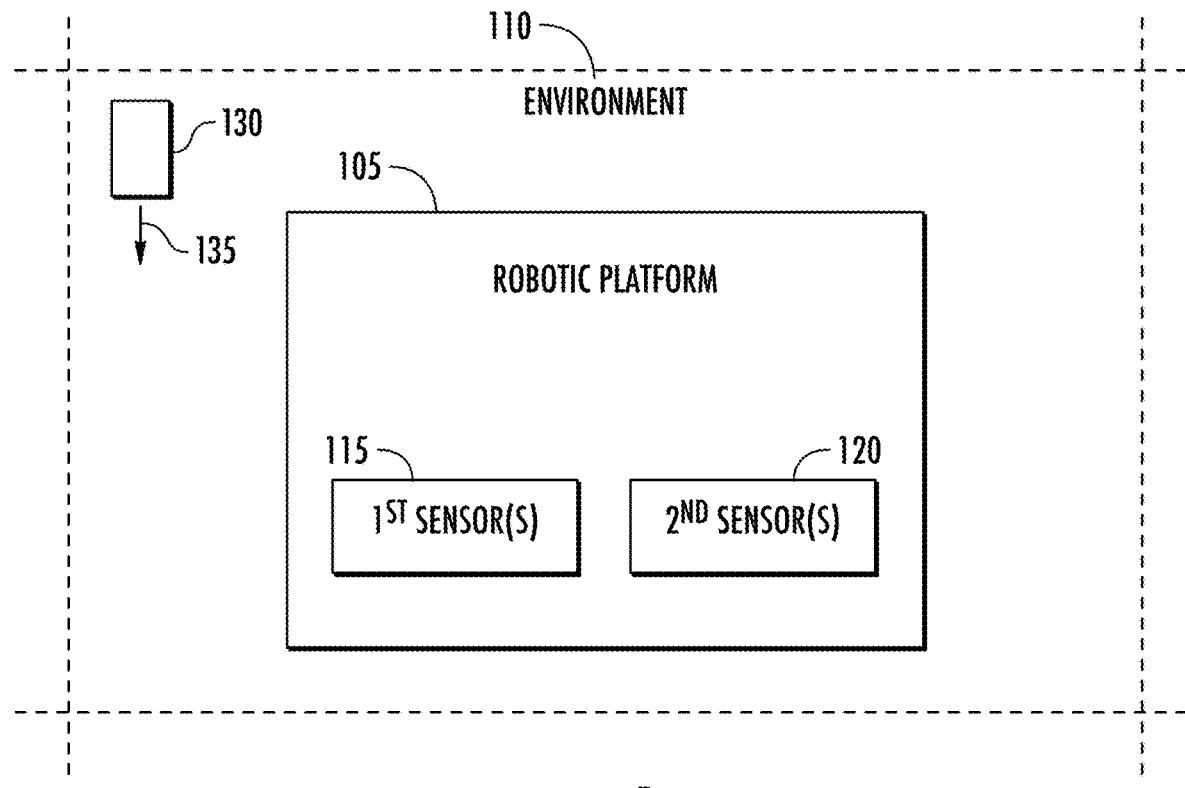
FIG. 1

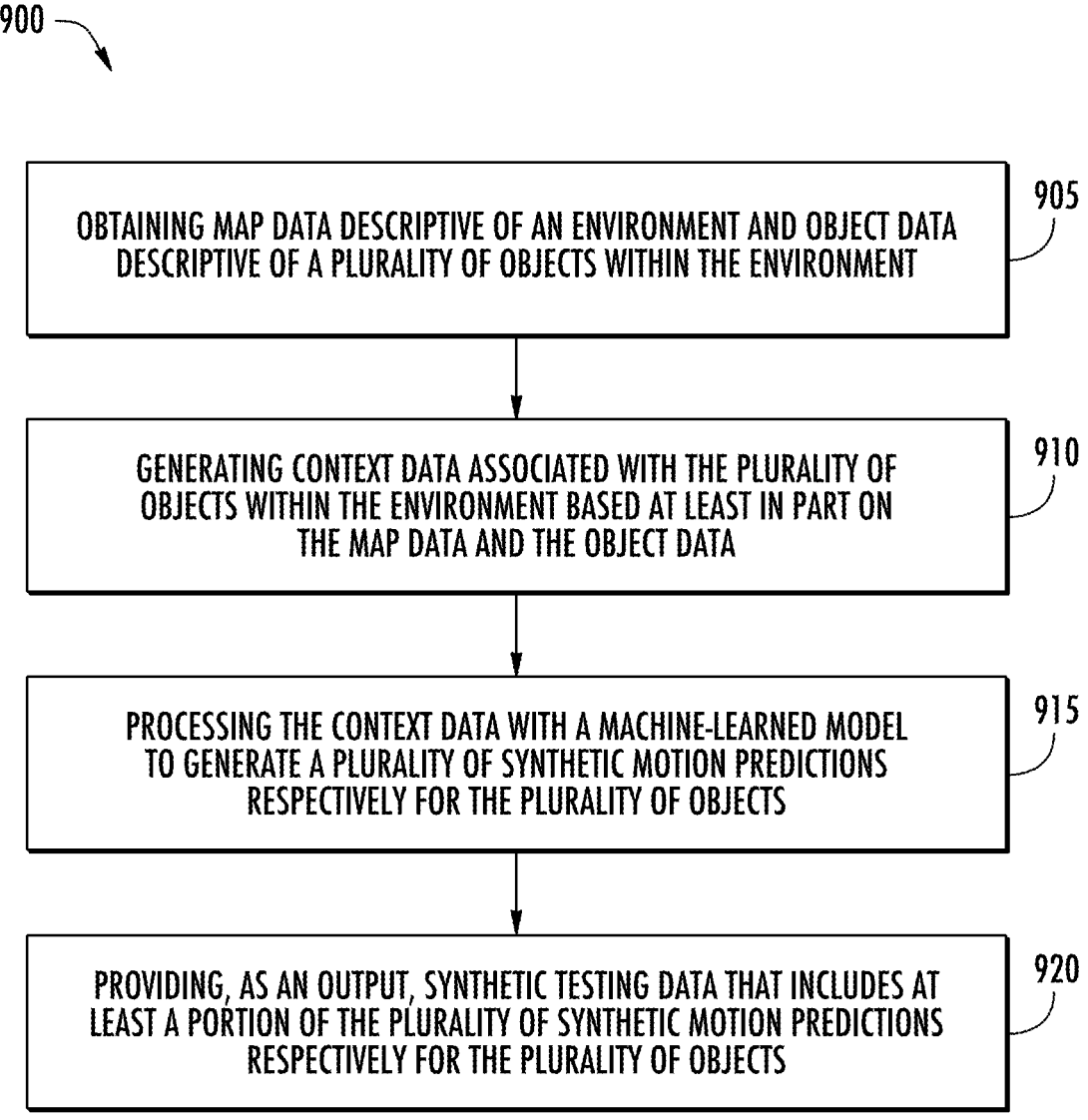

900

OBTAINING MAP DATA DESCRIPTIVE OF AN ENVIRONMENT AND OBJECT DATA DESCRIPTIVE OF A PLURALITY OF OBJECTS WITHIN THE ENVIRONMENT          905

GENERATING CONTEXT DATA ASSOCIATED WITH THE PLURALITY OF OBJECTS WITHIN THE ENVIRONMENT BASED AT LEAST IN PART ON THE MAP DATA AND THE OBJECT DATA          910

PROCESSING THE CONTEXT DATA WITH A MACHINE-LEARNED MODEL TO GENERATE A PLURALITY OF SYNTHETIC MOTION PREDICTIONS RESPECTIVELY FOR THE PLURALITY OF OBJECTS          915

PROVIDING, AS AN OUTPUT, SYNTHETIC TESTING DATA THAT INCLUDES AT LEAST A PORTION OF THE PLURALITY OF SYNTHETIC MOTION PREDICTIONS RESPECTIVELY FOR THE PLURALITY OF OBJECTS          920

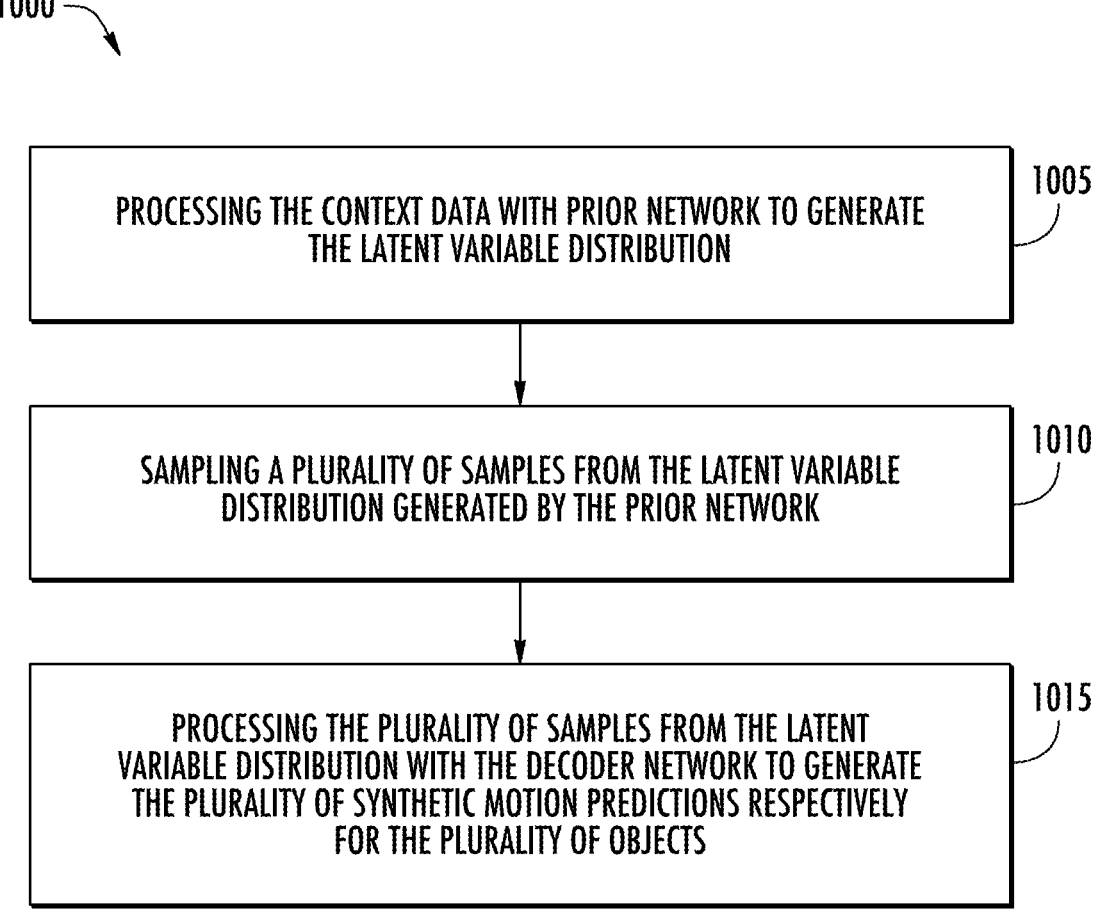

PROCESSING THE CONTEXT DATA WITH PRIOR NETWORK TO GENERATE THE LATENT VARIABLE DISTRIBUTION    1005

SAMPLING A PLURALITY OF SAMPLES FROM THE LATENT VARIABLE DISTRIBUTION GENERATED BY THE PRIOR NETWORK    1010

PROCESSING THE PLURALITY OF SAMPLES FROM THE LATENT VARIABLE DISTRIBUTION WITH THE DECODER NETWORK TO GENERATE THE PLURALITY OF SYNTHETIC MOTION PREDICTIONS RESPECTIVELY FOR THE PLURALITY OF OBJECTS    1015

FIG. 10

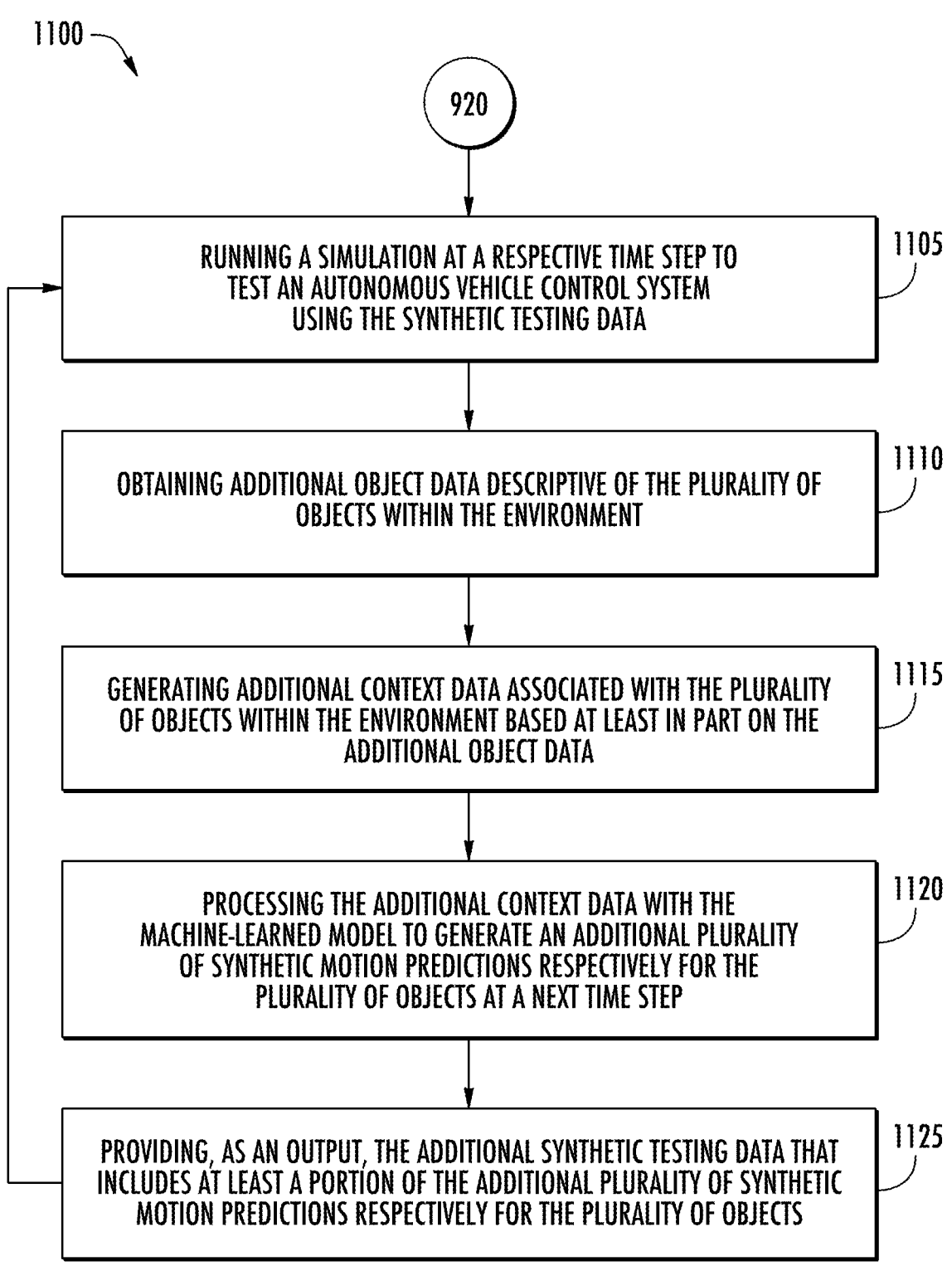

1100

920

RUNNING A SIMULATION AT A RESPECTIVE TIME STEP TO
TEST AN AUTONOMOUS VEHICLE CONTROL SYSTEM
USING THE SYNTHETIC TESTING DATA          1105

OBTAINING ADDITIONAL OBJECT DATA DESCRIPTIVE OF THE PLURALITY OF
OBJECTS WITHIN THE ENVIRONMENT          1110

GENERATING ADDITIONAL CONTEXT DATA ASSOCIATED WITH THE PLURALITY
OF OBJECTS WITHIN THE ENVIRONMENT BASED AT LEAST IN PART ON THE
ADDITIONAL OBJECT DATA          1115

PROCESSING THE ADDITIONAL CONTEXT DATA WITH THE
MACHINE-LEARNED MODEL TO GENERATE AN ADDITIONAL PLURALITY
OF SYNTHETIC MOTION PREDICTIONS RESPECTIVELY FOR THE
PLURALITY OF OBJECTS AT A NEXT TIME STEP          1120

PROVIDING, AS AN OUTPUT, THE ADDITIONAL SYNTHETIC TESTING DATA THAT
INCLUDES AT LEAST A PORTION OF THE ADDITIONAL PLURALITY OF SYNTHETIC
MOTION PREDICTIONS RESPECTIVELY FOR THE PLURALITY OF OBJECTS          1125

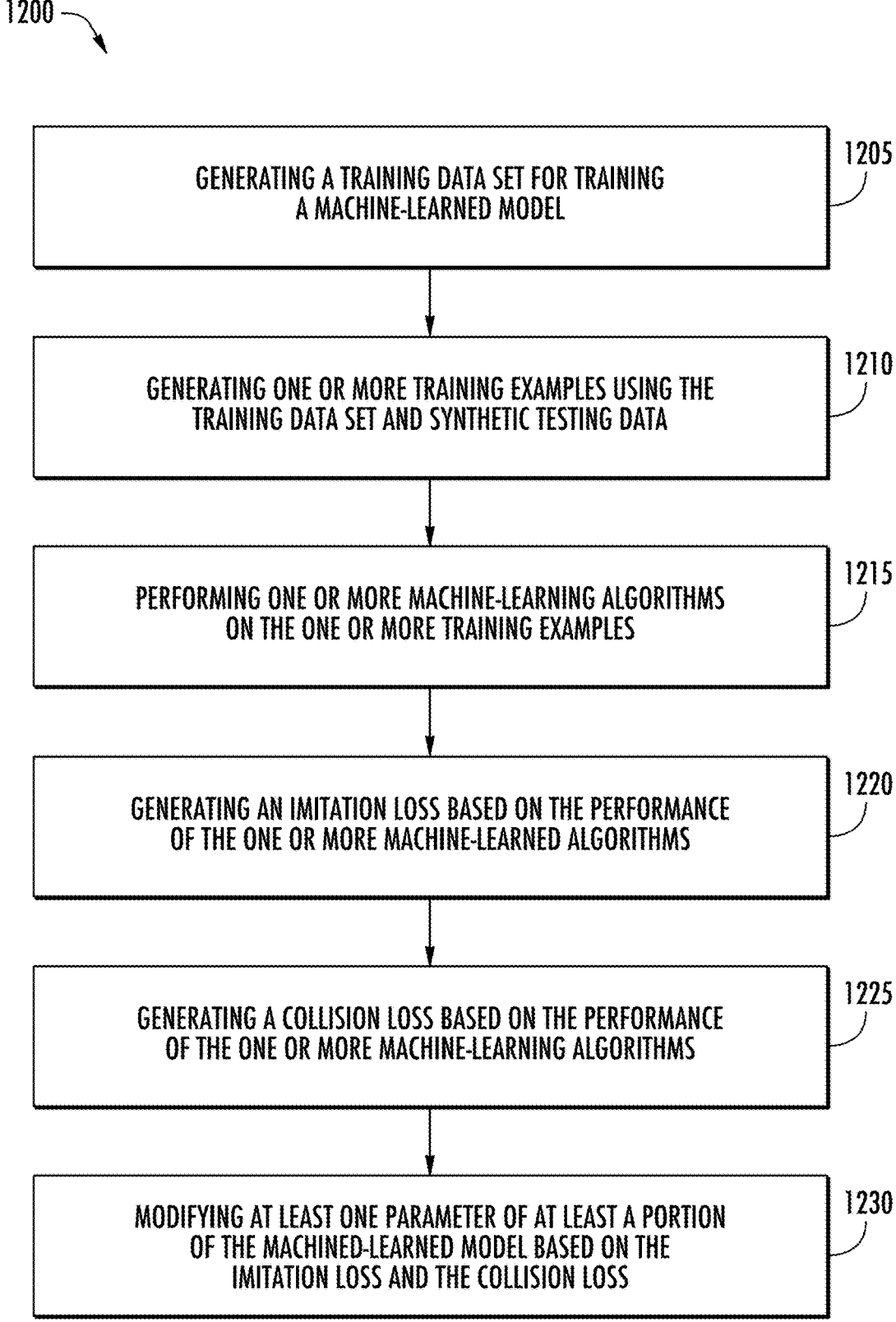

GENERATING A TRAINING DATA SET FOR TRAINING
A MACHINE-LEARNED MODEL

1205

GENERATING ONE OR MORE TRAINING EXAMPLES USING THE
TRAINING DATA SET AND SYNTHETIC TESTING DATA

1210

PERFORMING ONE OR MORE MACHINE-LEARNING ALGORITHMS
ON THE ONE OR MORE TRAINING EXAMPLES

1215

GENERATING AN IMITATION LOSS BASED ON THE PERFORMANCE
OF THE ONE OR MORE MACHINE-LEARNED ALGORITHMS

1220

GENERATING A COLLISION LOSS BASED ON THE PERFORMANCE
OF THE ONE OR MORE MACHINE-LEARNING ALGORITHMS

1225

MODIFYING AT LEAST ONE PARAMETER OF AT LEAST A PORTION
OF THE MACHINED-LEARNED MODEL BASED ON THE
IMITATION LOSS AND THE COLLISION LOSS

SYSTEMS AND METHODS FOR GENERATING SYNTHETIC MOTION PREDICTIONS

RELATED APPLICATION

The present application is based on and claims the benefit of U.S. Provisional Patent Application No. 63/114,862 having a filing date of Nov. 17, 2020, and U.S. patent application Ser. No. 17/528,577 having a filing date of Nov. 17, 2021, which are incorporated by reference herein in their entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments. The present disclosure is directed to systems and methods for generating synthetic testing data for autonomous vehicles. In particular, an example computing system can obtain map data descriptive of an environment and object data descriptive of a plurality of objects within the environment. For example, the object data can include a respective current state of the plurality of objects within the environment. The computing system can generate context data associated with the plurality of objects within the environment based at least in part on the map data and the object data. For example, the context data can include deep or latent features extracted from the map data and object data by one or more machine-learned models. The computing system can process the context data with a machine-learned multi-agent motion synthesis model to generate a plurality of synthetic motion predictions respectively for the plurality of objects. In some implementations, the machine-learned multi-agent motion synthesis model can be or include an implicit latent variable model. The synthetic motion prediction for the respective objects can include one or more synthesized states for the object. The computing system can provide, as an output, synthetic testing data that includes the plurality of synthetic motion predictions respectively for the plurality of objects. The synthetic testing data can be used to test an autonomous vehicle control system in a simulation.

More particularly, example systems generate synthetic testing data which can be used to massively scale evaluation of autonomous systems enabling rapid development and deployment. In particular, to close the gap between simulation and the real world, the present disclosure provides systems and methods which are able to simulate realistic multi-agent behaviors. Existing simulation environments rely on heuristic-based models that directly encode traffic rules, which cannot capture irregular maneuvers (e.g., nudging, U-turns) and complex interactions (e.g., yielding, merging). In contrast, example implementations of the present disclosure leverage real-world data to learn directly from human demonstration and thus capture a more diverse set of actor behaviors.

Thus, some example implementations of the present disclosure include and leverage a multi-agent behavior model for realistic traffic simulation. In particular, some example implementations include or leverage an implicit latent variable model to parameterize a joint actor policy that generates socially-consistent plans for all actors in the scene jointly. To learn a robust policy amenable to long horizon simulation, the policy can be unrolled in training and optimized through the fully differentiable simulation across time. Example learning objectives can include human demonstrations and variations thereof. The proposed systems and methods generate significantly more realistic and diverse traffic scenarios. This synthetic traffic data can be used as effective data augmentation for training a better motion planner or other learned components of an autonomous vehicle control system.

As an example, the present disclosure provides a computer-implemented method for generating synthetic testing data for autonomous vehicles. The method includes obtaining map data descriptive of an environment and object data descriptive of a plurality of objects within the environment. The object data comprises respective current states of the plurality of objects within the environment. The method includes generating context data associated with the plurality of objects within the environment based at least in part on the map data and the object data. The method includes processing the context data with a machine-learned model to generate a plurality of synthetic motion predictions respectively for the plurality of objects. The machine-learned model comprises an implicit latent variable model that generates a latent variable distribution representing interactions between the plurality of objects within the environment. The plurality of synthetic motion predictions comprise one or more synthesized states for the plurality of objects. The method includes providing, as an output, synthetic testing data that includes at least a portion of the plurality of synthetic motion predictions respectively for the plurality of objects.

In some implementations, the method includes running a simulation to test an autonomous vehicle control system using the synthetic testing data. During at least a portion of the simulation, a simulated object moves within a simulated environment in accordance with at least one synthetic motion prediction of the plurality of synthetic motion predictions.

In some implementations, the machine-learned model comprises a prior network and a decoder network. Processing the context data with the machine-learned model to generate the plurality of synthetic motion predictions respectively for the plurality of objects includes (i) processing the context data with the prior network to generate the latent variable distribution; (ii) sampling a plurality of samples from the latent variable distribution generated by the prior network; and (iii) processing the plurality of samples from the latent variable distribution with the decoder network to generate the plurality of synthetic motion predictions respectively for the plurality of objects. The prior network and the decoder network comprise graph neural networks.

In some implementations, the plurality of synthetic motion predictions for the plurality of objects comprise a plurality of synthesized states for the plurality of objects over a plurality of synthesized time steps.

In some implementations, providing, as an output, the synthetic testing data that includes at least a portion of the plurality of synthetic motion predictions respectively for the plurality of objects comprises including the plurality of synthesized states for the plurality of objects in the synthetic testing data.

In some implementations, providing, as an output, the synthetic testing data that includes at least a portion of the plurality of synthetic motion predictions respectively for the plurality of objects comprises including only a subset of the plurality of synthesized states for the plurality of objects in the synthetic testing data. In some implementations, generating the context data associated with the plurality of objects within the environment based at least in part on the map data and the object data and processing the context data with the machine-learned model to generate the plurality of synthetic motion predictions respectively for the plurality of objects is repeated for one or more additional synthesis iterations to generate one or more additional synthesized states for the plurality of objects for inclusion in the synthetic testing data.

In some implementations, the current states of the plurality of objects and the synthesized states for the plurality of objects are parameterized as a bounding box with position and heading relative to the map data.

In some implementations, generating the context data associated with the plurality of objects within the environment based at least in part on the map data and the object data includes generating motion context for the plurality of objects by encoding one or more past states for the plurality of objects; and generating map context for the plurality of objects by extracting features from the map data within a local region around the current state for the plurality of objects.

In some implementations, the machine-learned model is configured to generate synthetic motion predictions that comprise a plurality of synthesized states over a plurality of synthesized time steps. In some implementations, the machine-learned model has been trained by unrolling the machine-learned model and determining a respective loss at the plurality of synthesized time steps. In some implementations, the machine-learned model has been trained using a loss function. The loss function comprises an imitation term that encourages the machine-learned model to generate synthetic motion predictions that imitate ground truth motions. In some implementations, the machine-learned model has been trained using a loss function. The loss function comprises a collision term that encourages the machine-learned model to generate synthetic motion predictions that do not result in collisions.

As another example, in an aspect, the present disclosure provides a computing system including one or more processors and one or more computer-readable mediums storing instructions that when executed by the one or more processors cause the computing system to perform operations. The operations include obtaining map data descriptive of an environment and object data descriptive of a plurality of objects within the environment. The object data comprises respective current states of the plurality of objects within the environment. The operations include generating context data associated with the plurality of objects within the environment based at least in part on the map data and the object data. The operations include processing the context data with a machine-learned model to generate a plurality of synthetic motion predictions respectively for the plurality of objects. The machine-learned model comprises an implicit latent variable model that generates a latent variable distribution representing interactions between the plurality of objects within the environment. The plurality of synthetic motion predictions comprise one or more synthesized states for the plurality of objects. The operations include providing, as an output, synthetic testing data that includes at least a portion of the plurality of synthetic motion predictions respectively for the plurality of objects.

In some implementations, the machine-learned model comprises a prior network and a decoder network. Processing the context data with the machine-learned model to generate the plurality of synthetic motion predictions respectively for the plurality of objects includes (i) processing the context data with the prior network to generate a latent variable distribution; (ii) sampling a plurality of samples from the latent variable distribution generated by the prior network; and (iii) processing the plurality of samples from the latent variable distribution with the decoder network to generate the plurality of synthetic motion predictions respectively for the plurality of objects.

In some implementations, the operations include training one or more machine learning models of an autonomous vehicle control system via performance of machine learning algorithms on one or more training examples comprising the synthetic testing data.

As yet another example, in an aspect, the present disclosure provides one or more non-transitory computer-readable media that collectively store one or more machine-learned models. The one or more machine-learned models have been learned via performance of machine learning algorithms on one or more training examples comprising synthetic testing data. The synthetic testing data having been generated by performance of operations. The operations include obtaining map data descriptive of an environment and object data descriptive of a plurality of objects within the environment. The object data comprises a respective current state of the plurality of objects within the environment. The operations include generating context data associated with the plurality of objects within the environment based at least in part on the map data and the object data. The operations include processing the context data with the machine-learned model to generate the plurality of synthetic motion predictions respectively for the plurality of objects. The machine-learned model comprises an implicit latent variable model. The synthetic motion prediction for the plurality of objects comprises one or more synthesized states for the plurality of objects. The operations include providing, as an output, the synthetic testing data that includes at least a portion of the plurality of synthetic motion predictions respectively for the plurality of objects.

Other example aspects of the present disclosure are directed to other systems, methods, vehicles, apparatuses, tangible non-transitory computer-readable media, and devices for generating data (e.g., synthetic traffic data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 1 is a block diagram of an operational scenario, according to some implementations of the present disclosure;

FIG. 9 is a flowchart of a method for providing synthetic testing data, according to some implementations of the present disclosure;

FIG. 10 is a flowchart of a method for processing context data with a machine-learned model to generate a plurality of synthetic motion predictions respectively for a plurality of objects, according to some implementations of the present disclosure;

FIG. 11 is a flowchart of method for running a simulation, according to some implementations of the present disclosure;

FIG. 12 is a flowchart of method for training a machine-learned model, according to some implementations of the present disclosure.

DETAILED DESCRIPTION

Figure 2:
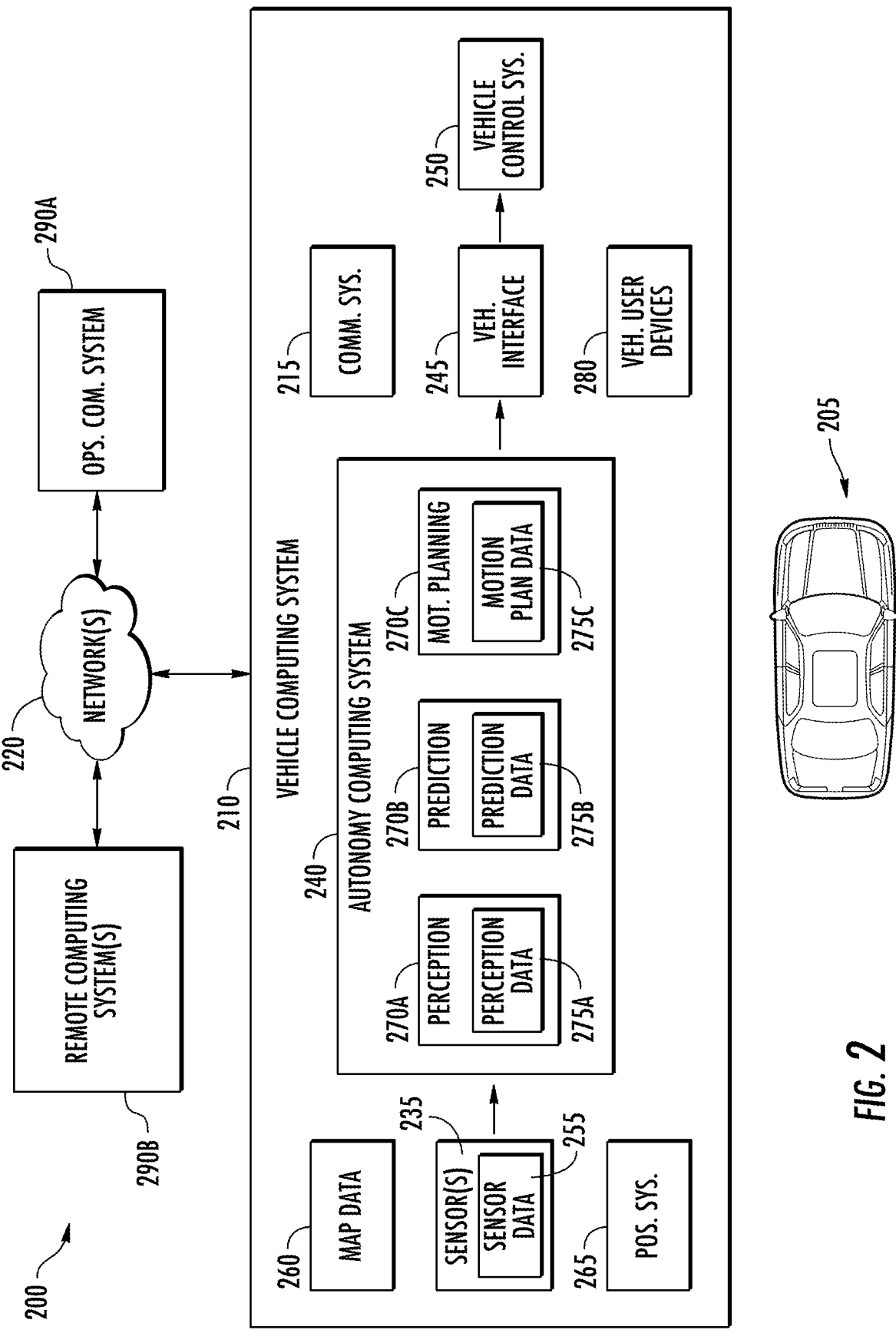
FIG. 2 is a block diagram of a system, according to some implementations of the present disclosure.

The following describes the technology of this disclosure within the context of an autonomous vehicle for example purposes only. As described herein, the technology described herein is not limited to an autonomous vehicle and can be implemented within other robotic and computing systems.

With reference now to FIGS. 1-13, example embodiments of the present disclosure will be discussed in further detail. FIG. 1 is a block diagram of an operational scenario 100, according to some implementations of the present disclosure. The operational scenario 100 includes a autonomous platform 105 and an environment 110. The environment 110 can be external to the autonomous platform 105. The autonomous platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.). The environment 110 can include a real-world environment or a simulated environment. A simulated environment, for example, can include a generated environment modelled after one or more real-world scenes and/or scenarios. The operation of the autonomous platform 105 can be simulated within a simulated environment by providing data indicative of the simulated environment (e.g., historical data associated with a corresponding real-world scene, data generated based on one or more heuristics, etc.) and/or one or more objects therein (e.g., synthetic testing data, etc.) to one or more systems of the autonomous platform 105.

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. The autonomous platform 105 can include one or more sensor(s) 115, 120. The one or more sensors 115, 120 can be configured to generate or store data descriptive of the environment 110 (e.g., one or more static or dynamic object(s) 130 therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks, passenger vehicles, etc. By way of example, the autonomous platform 105 can include an autonomous truck including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

FIG. 2 is a block diagram of a system 200, according to some implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. The vehicle computing system 210 can be an autonomous vehicle control system for an autonomous vehicle. For example, the vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 or also omitted from remote control of the vehicle 205. In some implementations, a human operator can be included in the vehicle 205.

The vehicle 205 can be configured to operate in a plurality of operating modes. The vehicle 205 can be configured to operate in a fully autonomous (e.g., autonomous) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system 290B (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. In some implementations, the remote computing device(s) 290B can be associated with a service entity that coordinates and manages a vehicle service. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for gathering training data, generating synthetic testing data, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain sensor data (e.g., a portion of sensor data 255) indicative of one or more dynamic objects within an environment of the vehicle 205. As described herein with reference to the remaining figures, the sensor data 255 can be collected in real-time while the vehicle 205 is operating in a real-world environment or the sensor data 255 can be fed to the sensor(s) 235 to simulate a simulated environment. The sensor data 255, for example, can include simulation data for evaluating one or more machine-learned models or algorithms of the vehicle computing system 210, etc.

More generally, the sensor(s) 235 can be configured to acquire sensor data 255. The sensor(s) 235 can be external sensors configured to acquire external sensor data. This can include sensor data associated with the surrounding environment (e.g., in a real-world or simulated environment) of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, or below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curbs); the location and direction of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indication of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data 260 can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict/forecast a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the portion of autonomy computing system 240 dedicated to prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points, footprints, etc. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The portion of autonomy computing system 240 dedicated to motion planning function 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be trained through one or more machine-learned techniques. For instance, the machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include simulation data indicative of a plurality of environments and/or testing objects/object trajectories at one or more times. The simulation data can be indicative of a plurality of dynamic objects within the environments and/or one or more synthetic motion predictions for the plurality of dynamic objects. In some implementations, the training data can include a plurality of environments previously recorded by the vehicle 205. For instance, the training data can be indicative of a plurality of dynamic objects previously observed or identified by the vehicle 205.

Figure 3:
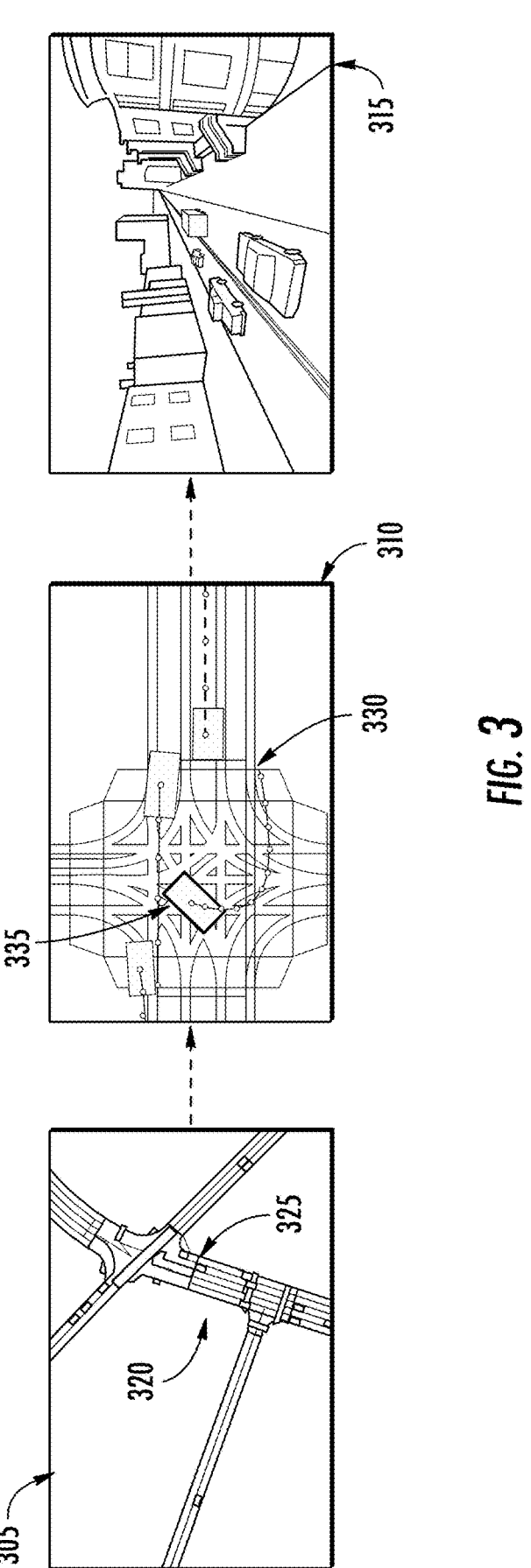
FIG. 3 is an example simulation scenario, according to some implementations of the present disclosure.

In some implementations, the training data can include simulation data augmented with simulated objects configured to move within a simulated environment according to one or more synthetic motion predictions configured to emulate realistic traffic conditions. By way of example, FIG. 3 is an example simulation scenario 300, according to some implementations of the present disclosure. The example simulation scenario 300 can include at least three operations 305-315. The operations can include a first operation 305 of specifying a scene layout. The scene layout can include a road topology 320 and actor placement locations 325 with respect to the road topology 320. The operations can include a second operation 310 of simulating a motion 330 of dynamic object 335 over a period of time. A third operation 315 can include rendering the generated scenario with realistic geometry and appearance.

Generating realistic multi-agent behaviors such as, for example, the motion 330 or the object 335 can introduce a number of different simulation scenarios helpful in the testing, validation, and/or learning of different autonomy tasks. To increase the diversity and efficiency of generating realistic multi-agent behaviors, the first operation 305 can be expedited by automating background objects, increased scenario coverage can be obtained by generating variants with emergent behaviors, and interactive scenario design can be facilitated by generating a preview of potential interactions. However, manually specifying each object's trajectory (e.g., such as the object trajectory 330) can be unscalable and can result in unrealistic simulations since objects (e.g., object 335) can not react to a tested autonomous vehicle's actions. Heuristic-based models can be used to capture basic reactive behavior but rely on directly encoding traffic rules such that objects follow the road and do not collide. While this approach generates plausible traffic flow, the generated behaviors lack the diversity and nuance of human behaviors and interactions present in the real-world.

Figures 4A, 4B:
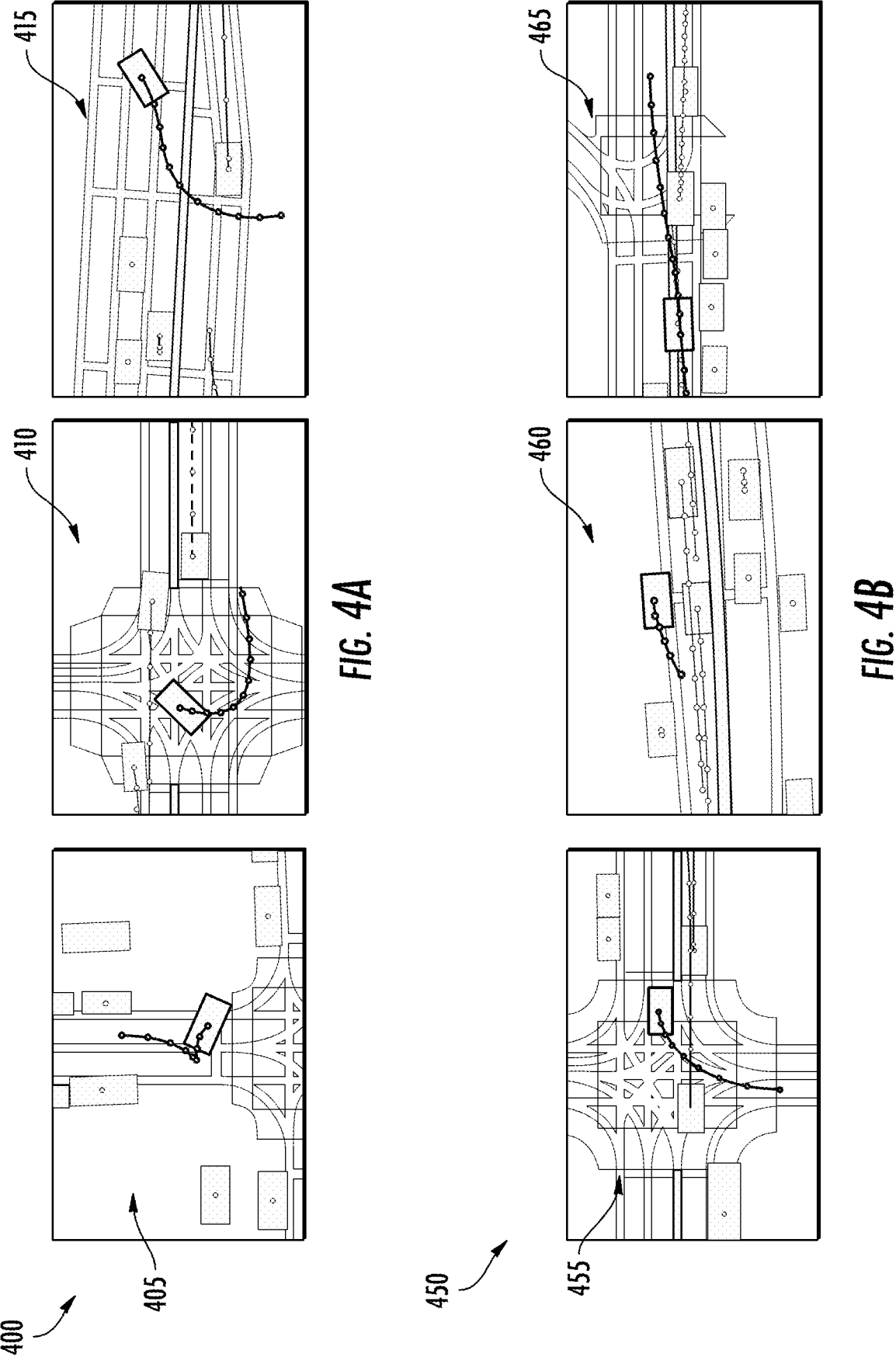
FIGS. 4A-B are examples of vehicle maneuvers and interactions, according to some implementations of the present disclosure.

By way of example, FIGS. 4A-B are examples of vehicle maneuvers 400 and interactions 450. In some instances, the vehicle maneuvers 400 and interactions 450 can present technical difficulties for previous simulation techniques. FIG. 4A can include examples of vehicle maneuvers 400 that can be irregular (e.g., scarce in the real world) such as a three-point turn 405, a U-turn 410, and maneuvers 415 that do not comply with traffic rules. Such vehicle maneuvers 400 can be difficult to simulate as they do not follow a lane graph. FIG. 4B are examples of interactions 450 including yielding actions 455, merging actions 460, and passing actions 465 that rely on modeling the complex interaction between at least two objects. Machine-learning techniques for capturing a diverse set of behaviors such as the vehicle maneuvers 400 and/or the interactions 450 of FIGS. 4A-B can lack common sense and can be generally brittle to distributional shift. Moreover, such techniques can be computationally expensive if not optimized for simulating large numbers of objects over a long horizon.

The present disclosure is directed to a multi-agent behavior model that leverages an implicit latent variable model to parameterize a joint actor policy that generates consistent plans for simulated objects. The joint actor policy can be robust and amenable for long horizon simulation by unrolling the policy in training and optimizing through a fully differentiable simulation across time. The model(s) can be trained using a time-adaptive multi-task loss that balances between learning from demonstration and common sense at each timestep of the simulation. In this way, the learning objective can incorporate both human demonstrations as well as common sense, such that the simulated objects can cover significantly more realistic and diverse traffic scenarios (e.g., vehicle maneuvers 400, interactions 450, etc.).

Figure 5:
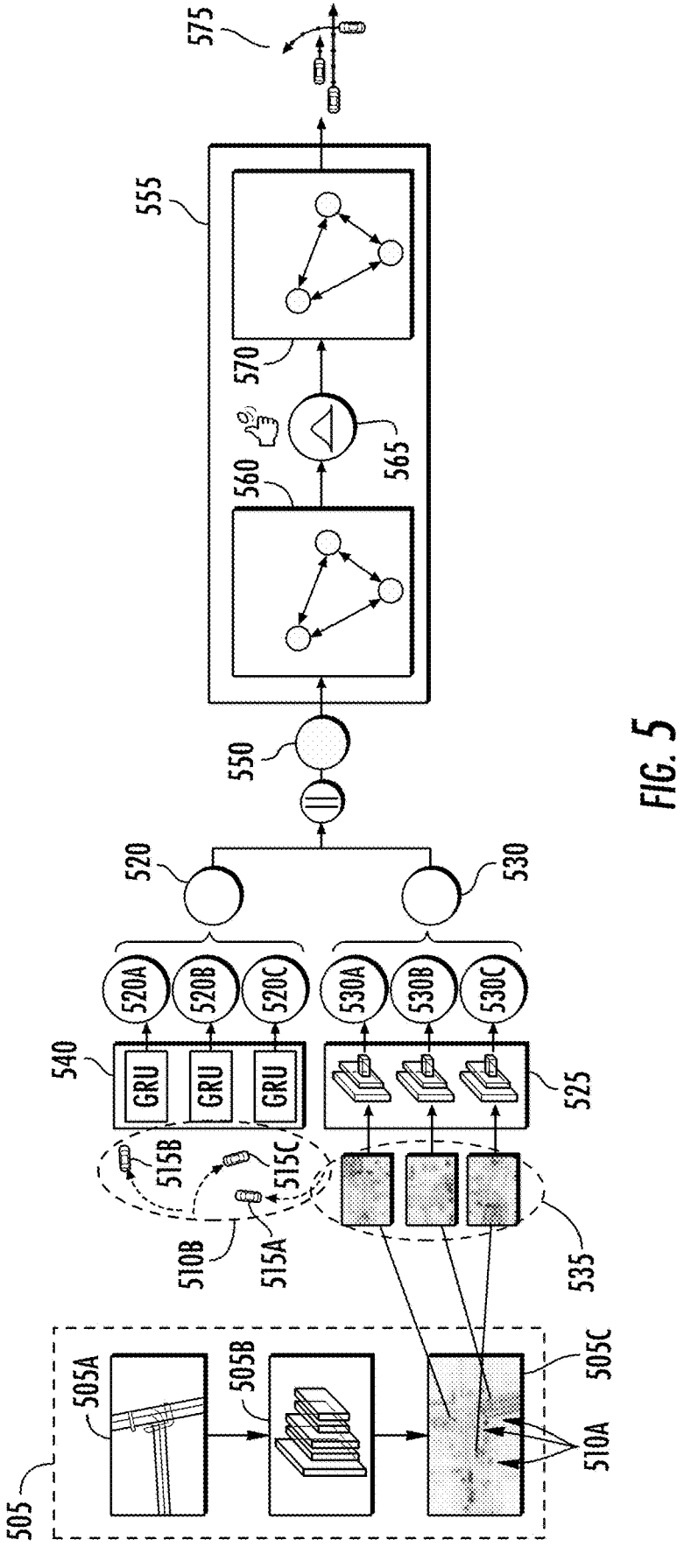
FIG. 5 is a diagram of a system for generating a plurality of synthetic motion predictions respectively for a plurality of objects, according to some implementations of the present disclosure.

FIG. 5 is a diagram of a system 500 for generating a plurality of synthetic motion predictions respectively for a plurality of objects, according to some implementations of the present disclosure. The system 500 can include one or more machine-learning models. In some implementations, the one or more machine-learning models can include a machine-learning multi-agent motion synthesis model learned to output realistic multi-agent behaviors for traffic simulation based on one or more inputs (e.g., map data 505A, current/past object states 510A, 510B). The machine-learning multi-agent motion synthesis model can learn to simulate motion of a plurality of objects forward in time based on map data 505A including, for example, a high-definition map (e.g., denoted $\mathcal{M}$), a traffic control (e.g., denoted $\mathcal{C}$), and/or initial dynamic states (e.g., current object states 510A) for a plurality of objects (e.g., N number of objects). By way of example, the notation $$Y^t = \{y_1^t, y_2^t, \ldots, y_N^t\}$$

can be used throughout the present disclosure to denote a collection of N object states (e.g., current object states 510A) at time t. Each object state (e.g., current object states 510A, past object states 510B, etc.) can be parameterized as a bounding box $$y_i^t = (b_x, b_y, b_w, b_h, b_\theta)$$

US 12,637,112 B2

17 with a two dimensional position, width, height, and/or heading.

The system 500 (e.g., a machine-learning multi-agent motion synthesis model) can extract rich context from a simulation environment. To do so, the system 500 can obtain map data 505A descriptive of an environment. The map data 505A, for example, can include high-definition map information indicative of a map topology and/or one or more mapping features thereof. For instance, the map data 505A can identify the placement and/or state of one or more roads (e.g., direction of travel, number of lanes, etc.), traffic signals (e.g., traffic lights, traffic signage, etc.), etc. By way of example, the map data 505A can include high-definition maps capturing the geometry and/or the topology of one or more road networks.

In some implementations, the system 500 can receive the map data 505A that includes a region of interest centered around an autonomous vehicle. The region can include a region of any size such as, for example a region that spans one hundred and forty meters along the direction of the autonomous vehicle's heading and eighty meters across. The region can be fixed across time for a simulation. In some implementations, the map data 505A can identify one or more positions, headings, etc. for a plurality of objects within the environment.

The system 500 can obtain object data (e.g., current object states 510A, past object states 510B, etc.) descriptive of a plurality of objects 515A-C within the environment. The object data can be indicative of one or more states (e.g., current object states 510A, past object states 510B, etc.) for the plurality of objects 515A-C. For instance, the object data can include respective current object states 510A of the plurality of objects 515A-C within the environment at a current time. Additionally, or alternatively, the object data can include one or more respective past object states 510B for the plurality of objects 515A-C within the environment. The respective current/past object states for a respective object of the plurality of objects 515A-C can be parameterized as a bounding box with position and heading relative to the map data 505A.

The system 500 can extract rich scene context from the map data 505A and the object data. For example, the system 500 can include a differentiable local observation module that takes as input the one or more past object states 510B (e.g., denoted $Y^{:t}$), traffic control information (e.g., denoted $\mathcal{C}$), and the map data 505A (e.g., denoted $\mathcal{M}$), and processes them in one or more (e.g., two) stages.

For example, during a first stage, a machine-learned backbone network 505B (e.g., convolutional neural network, etc.) can process the map data 505A to extract map features 505C (e.g., denoted $\tilde{M}$) from the map data 505A (e.g., $\mathcal{M}$). In some implementations, the map features 505C can be processed once and cached for repeated simulation runs. The processed map features 505C can include a rasterized map representation that encodes traffic elements into different channels of a raster. The map features 505C can include map channels consisting of intersections, lanes, roads, etc. The system 500 (e.g., the machine-learned backbone network 505B) can encode traffic control as additional channels, by rasterizing the lane segments controlled by the traffic light. The system 500 can initialize each scenario with one or more seconds (e.g., three, etc.) of past object states 510B, with each object history represented by one or more bounding boxes (e.g., seven, etc.) across time, each a one or more or at least a portion of (e.g., a half, etc.) second apart. When an object does not have the full history, the system 500 can fill the missing states.

In some implementations, the system 500 can utilize the machine-learned backbone network 505B to extract the map features 505C at different resolution levels to encode both near and long-range map topology. The machine-learned backbone network 505B can include a sequence of four blocks, each with a single convolutional layer of kernel size three and eight, sixteen, thirty-two, and sixty-four channels. After each block, the map features 505C can be downsampled using max pooling (e.g., with stride 2). The feature maps from each block can be resized (e.g., via average-pooling or bilinear sampling) to a common resolution (e.g., of 0.8 m), concatenated, and processed by a header block with two additional convolutional layers (e.g., with sixty four channels).

During a second stage, the system 500 can process the map features 505C and the object data to receive map context 530 and/or motion context 520 for each step (e.g., a time step, etc.) of a simulation. For instance, the map context 530 can be extracted by a map feature extractor 525. The map context 530 can be generated for the plurality of objects 515A-C by extracting features 535 from the map features 505C within a local region around the current object states 510A (e.g., a region corresponding to a respective object) for the plurality of objects 515A-C. To extract the features 535

(e.g., denoted $X_m^t$)

around each object 515A-C, a region of interest extraction algorithm (e.g., a Rotated Region of Interest Align, bilinear interpolation, etc.) can be applied to the map features 505C (e.g., $\tilde{M}$) generated by pre-processing (e.g., with the machine-learned backbone network 505B) the map data 505A. By way of example, for extracting the features 535 from the pre-processed map features 505C, the system 500 can use a region of interest extraction algorithm with seventy meters in front, ten meters behind, and twenty meters on each side. The extracted features 535 can be further processed by the map feature extractor 525 (e.g., a three-layer convolutional network), and then max-pooled across the spatial dimensions.

The motion context 520 can be extracted by a past trajectory encoder 540. For instance, the machine-learned model can generate the respective motion context 520A-C for the plurality of objects 515A-C by encoding the one or more past states 510B for the plurality of objects 515A-C. The past trajectory encoder 540, for example, can include a four-layer gated recurrent unit with a number of hidden gates (e.g., one hundred and twenty eight, etc.). The past trajectory encoder 540 can be employed to encode the past trajectories of each object 515A-C in the environment. The system 500 can directly encode numerical values parameterizing bounding boxes of the object 515A-C using a past trajectory encoder 540 (e.g., a four-layer gated recurrent unit) with one hundred and twenty eight hidden states and rely on a graph neural network based module for intersection reasoning. For instance, the system 500 can fill Not a Number ("NaN") values with zeros, and also pass in a binary mask indicating missing values to the past trajectory encoder 540. The resulting motion context 520

(e.g., denoted $X_r^t$)

can include a plurality of features associated with the motion of each object 515A-C. The machine-learned model can generate context data 550 associated with the plurality of objects 515A-C within the environment based at least in part on the map data 505A and the object data. For instance, features of the map context 530 and/or the motion context 520 can be concatenated to form the context data 550

$$\text{(e.g., denoted } X^t = [X_m^t, X_\tau^t]).$$

The context data 550 (e.g., denoted as $x_i$) for each object 515A-C (e.g., denoted as i) can include a vector formed by concatenating the map context 530 and motion context 520. This can be, for example, a one-hundred and ninety two dimensional vector.

The system 500 can implement a joint actor policy that explicitly reasons about object interaction and generates future actor plans. The system 500, for example, can process the context data 550 to generate synthetic testing data 575. The synthetic testing data 575 can include a plurality of synthetic motion predictions respectively for the plurality of objects 515A-C. The system 500, for example, can include an implicit latent variable model 555 that generates a latent variable distribution 565 representing interactions between the plurality of objects 515A-C within the environment. The implicit latent variable model 555, for example, can include a prior network 560 and a decoder network 570. The prior network 560 and the decoder network 570 can include any of a number of machine-learned models such as those described herein with reference to the other figures. In some implementations, the prior network 560 and/or the decoder network 570 can include one or more graph neural networks.

The synthetic testing data 575 (e.g., the plurality of synthetic motion predictions) can include one or more synthesized states for the plurality of objects 515A-C. The synthesized states for the plurality of objects 515A-C, for example, can be parameterized as a bounding box with position and heading relative to the map data 505A. The machine-learned model (e.g., implicit latent variable model 555) can be configured to generate synthetic motion predictions that include the plurality of synthesized states over a plurality of synthesized time steps. For instance, the prior network 560 can process the context data 550 to generate the latent variable distribution 565. The implicit latent variable model 555 can sample a plurality of samples from the latent variable distribution 565 generated by the prior network 560. The plurality of samples from the latent distribution 565 can be processed with the decoder network 570 to generate a plurality of synthetic motion predictions respectively for the plurality of objects 515A-C.

The implicit latent variable model 555 can explicitly reason about multi-object interaction to sample multiple socially consistent plans for all objects in the environment in parallel. The joint distribution over object's future states (e.g., denoted $\mathcal{Y}^t = \{Y^{t+1}, Y^{t+2}, \ldots, Y^{t+T_{plan}}\}$) enables the machine-learned model to leverage supervision over a full planning horizon $T_{plan}$ to learn better long-term interaction. The implicit latent variable model 555 can implicitly characterize the distribution:

$$P(\mathcal{Y}^t | X^t) = \int_Z P(\mathcal{Y}^t | X^t, Z^t) P(Z^t | X^t)$$

The decoder 570 can include a deterministic decoder (e.g., $\mathcal{Y}^t = f(X^t, Z^t)$) and can be used to encourage the environment latent feature (e.g., denoted Z) to capture all stochasticity and avoid factorizing $P(\mathcal{Y}^t | X^t, Z^t)$ across time. This can allow the generation of K scene-consistent samples of actor plans efficiently in one stage of parallel sampling, by first drawing latent samples $$Z_{(k)}^t \sim P(Z^t | X^t),$$

and then decoding object plans $$\mathcal{Y}_{(k)}^t = f(Z_{(k)}^t, X^t).$$

Moreover, a posterior latent distribution $q(Z^t, |X^t, \mathcal{Y}^t)$ can be approximated to leverage variational inference for learning. In some implementations, it learns to map ground truth future $\mathcal{Y}_{GT}^t$, to the environment latent space for reconstruction.

The prior network 560 (e.g., denoted $p_\gamma(Z^t | X^t)$), posterior network (e.g., denoted $q_\phi(Z^t, |X^t, \mathcal{Y}^t)$), and/or the decoder 570 (e.g., $\mathcal{Y}^t = f_\theta(X^t, Z^t)$) can be parameterized using a graph neural network (GNN) for encoding to and decoding from the environment-level latent variable $Z^t$. By propagating messages across a fully connected interaction graph with objects 515A-C as nodes, the latent space can learn to capture not only individual object goals and style, but also multi-agent interactions. The latent space can be partitioned to learn a distributed representation $Z^t = \{z_1, z_2, \ldots, z_N\}$ of the environment, where $z_n$ is spatially anchored to an (e.g., n) and captures unobserved dynamics most relevant to that object. This enables effective relational reasoning across a large and variable number of objects and diverse map topologies (e.g., to deal with the complexity of urban traffic).

By way of example, the system 500 can leverage a graph neural network based scene interaction model to parameterize a joint actor policy. The scene interaction model can include an edge function $\varepsilon^{(k)}$ that consists of a three-layer multilayer perceptron that takes as input the hidden states of the two terminal nodes at each edge in the graph at the previous propagation operation as well as the projected coordinates of their corresponding bounding boxes. The system 500 can use feature-wise max-pooling as an aggregate function $\mathcal{A}^{(k)}$. To update the hidden states, the system 500 can use a gated recurrent unit cell as $\mathcal{U}^{(k)}$. The system 500 outputs the results from the graph propagations using another multilayer perception as a readout function $\mathcal{O}$.

For example, the system 500 can provide, as an output, synthetic testing data 575 that includes at least a portion of the plurality of synthetic motion predictions respectively for the plurality of objects 515A-C. The plurality of synthetic motion predictions for the plurality of objects 515A-C can include a plurality of synthesized states for the plurality of objects 515A-C over a plurality of synthesized time steps. The plurality of synthesized states for the plurality of objects 515A-C can be included in the synthetic testing data 575. In some implementations, only a subset of the plurality of synthesized states for the plurality of objects 515A-C are included in the synthetic testing data 575. In some implementations, the system 500 can repeatedly generate the context data 550 and the plurality of synthetic motion predictions for one or more additional synthesis iterations to generate one or more additional synthesized states for the plurality of objects 515A-C for inclusion in the synthetic testing data 575.

Figure 6:
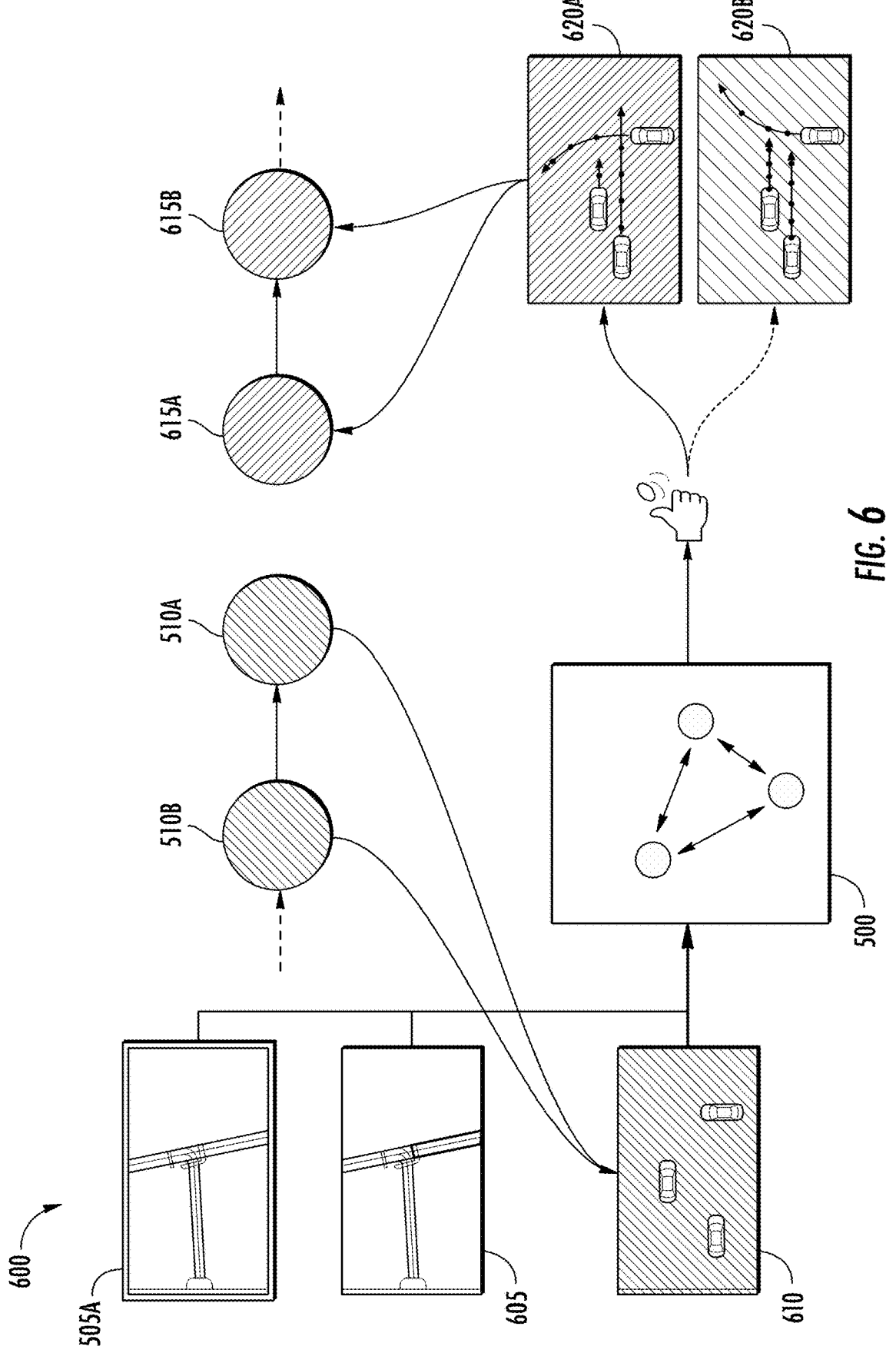
FIG. 6 is a diagram of a system for generating a plurality of synthetic motion predictions respectively for a plurality of objects, according to some implementations of the present disclosure.

FIG. 6 is a diagram of a system 600 for generating a plurality of synthetic motion predictions 620A-B respectively for a plurality of objects, according to some implementations of the present disclosure. The system 600 can run a simulation scenario using synthetic testing data (e.g., synthetic testing data 575 of FIG. 5) including one or more of the plurality of synthetic motion predictions 620A-B. The system 600, for example, can run a simulation to test a vehicle computing system, autonomy system, autonomous vehicle control system, etc. using the synthetic testing data. During at least a portion of the simulation, a simulated object can move within a simulated environment in accordance with at least one of the plurality of synthetic motion predictions 620A-B.

By way of example, the system 600 can receive map data 505A, traffic control data 605, and object data 610 including past object states 510B and current object states 510A for a plurality of objects within the environment represented by the map data 505A. The system 600 can output the plurality of synthetic motion predictions 620A-B (and/or a portion thereof) in response to the receipt of the map data 505A, traffic control data 605, and object data 610 including past object states 510B and current object states 510A for a plurality of objects within the environment represented by the map data 505A.

The system 600 can model a traffic scenario as a sequential process where objects interact and plan their behaviors at each timestep. Leveraging the system 500 (e.g., including a machine-learning multi-agent motion synthesis model), different traffic scenarios can be generated by starting with an initial object history (e.g., including current object states 510A, past object states 510B, etc.) (e.g., denoted $Y^{-H:0}$) of the objects and simulating their motion forward for T steps. At each timestep t, context data (e.g., $X^t$) can be extracted and synthetic motion predictions 620A-B (e.g., $\mathcal{Y}^t \sim P_{\theta,\gamma}(\mathcal{Y}^t|X^t)$) including one or more synthesized states 615A-B can be sampled for each of a plurality of objects as shown in FIG. 5. The position and/or movement of objects in a simulated environment can be updated based on one or more first synthesized states 615A for the objects at a first future time step. In addition, or alternatively, the position and/or movement of objects in the simulated environment can be updated based on one or more second synthesized states 615B for the objects at a multiple future time steps:

$$P\!\left(Y^{1:T} \mid Y^{-H:0}, \mathcal{M}, \mathcal{C}\right) = \prod_{t \in \mathcal{T}} P\!\left(Y^{t+1:t+K} \mid X^t\right)$$

In some implementations, the synthetic motion predictions 620A-B can be sampled at multiple time steps to obtain parallel simulations.

Turning back to FIG. 5, the system 500 can include a machine-learned model (e.g., a machine-learning multi-agent motion synthesis model) that can be trained by unrolling the machine-learned model and determining a respective loss at the plurality of synthesized time steps.

Figure 7:
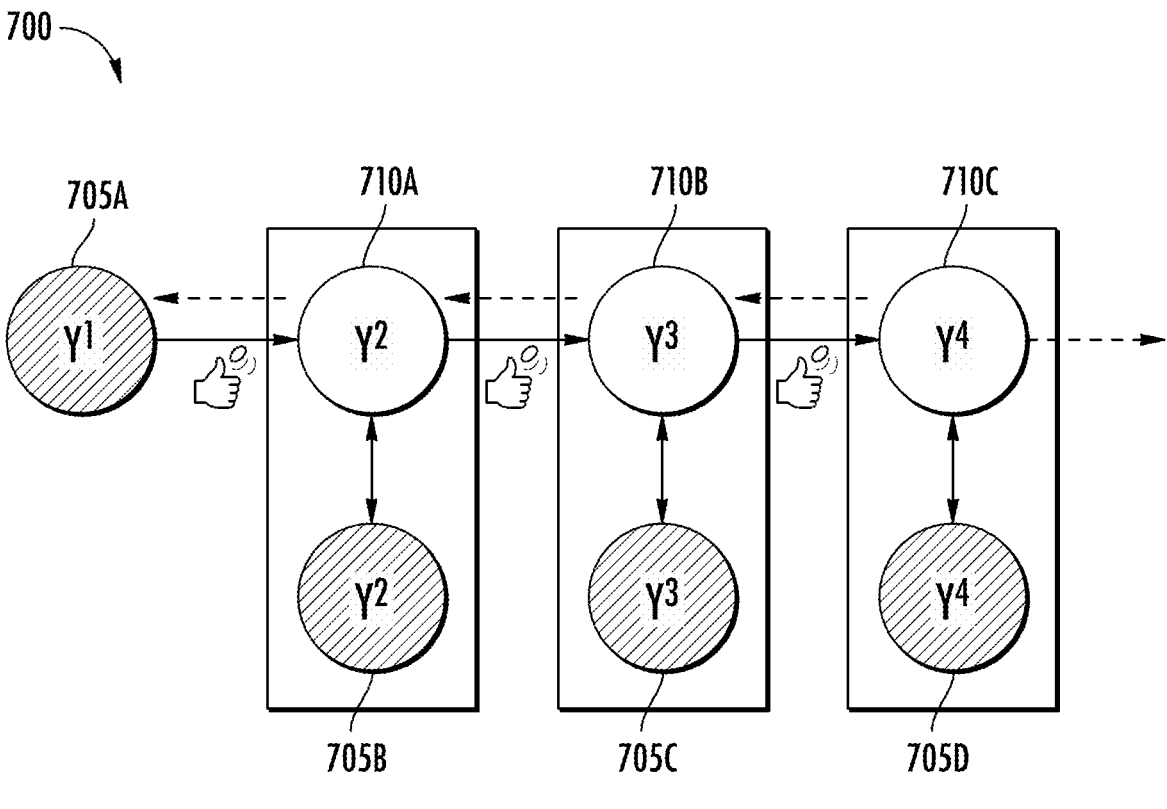
FIG. 7 is an example training scenario for training a machine-learned model, according to some implementations of the present disclosure.

By way of example, FIG. 7 is an example training scenario 700 for training a machine-learned model, according to some implementations of the present disclosure. The machine-learned model can be unrolled for closed-loop training. For instance, a loss Lt can be determined at each time step t based on a comparison of a synthesized state 710A-C to ground truth data 705A-D for respective time steps. The total loss can be directly optimized with back-propagation through the simulation across time. In some implementations, the gradient can be back-propagated through actions sampled from the machine-learned model at each time step via reparameterization. This can give a direct signal for how current decision influences future states.

Figure 8:
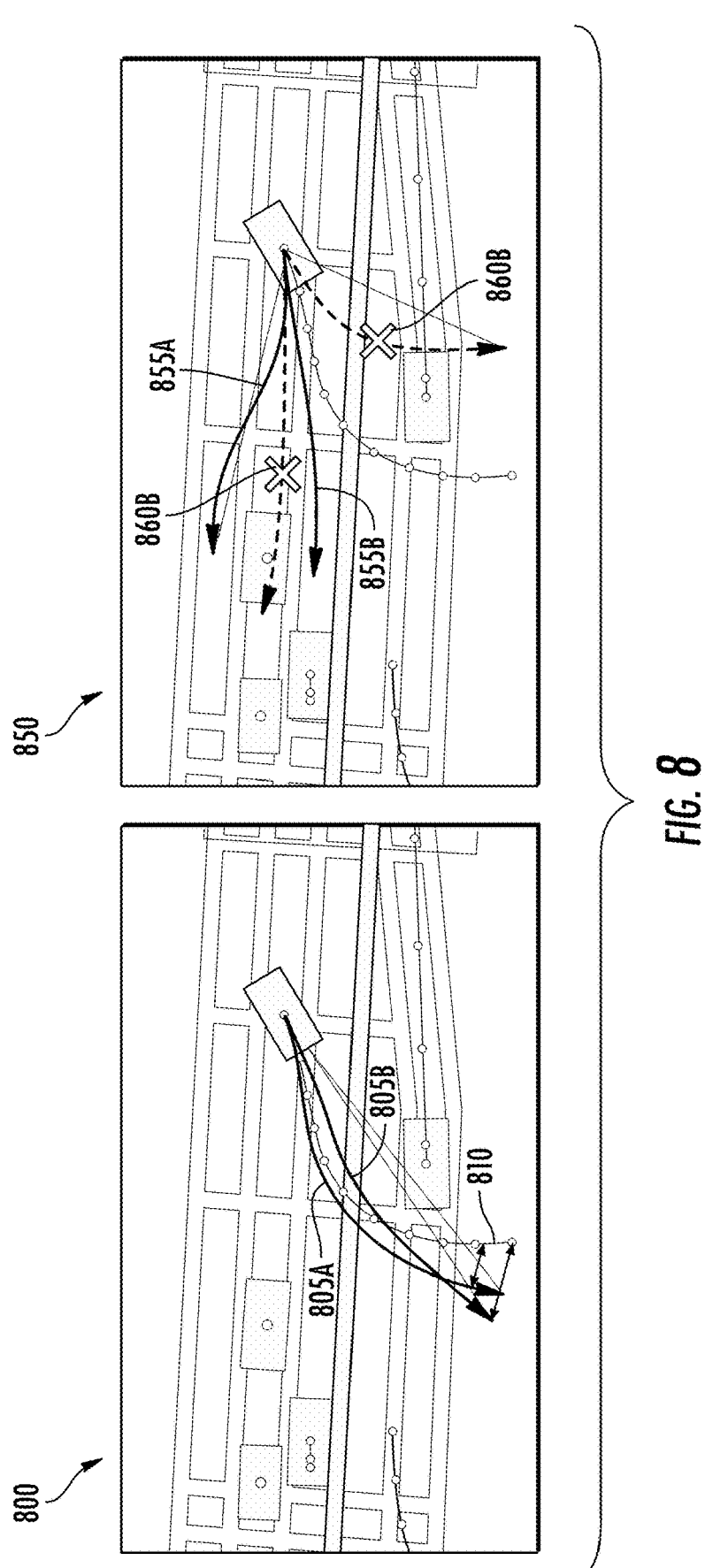
FIG. 8 is an illustration of example training terms for training a machine-learned model, according to some implementations of the present disclosure.

FIG. 8 is an illustration of example training terms 800, 850 for training a machine-learned model, according to some implementations of the present disclosure. The training terms 800, 850 are depicted in FIG. 8 in a manner to help represent the components of the respective training terms 800, 850 and are not meant to be limiting. The example training terms 800, 850 can be evaluated through a multi-task loss that balances between learning from demonstration and injecting common sense. The multi-task loss can balance supervision from imitation and common sense:

$$\mathcal{L} = \sum_t \lambda(t)\mathcal{L}^t_{imitation} + (1 - \lambda(t))\mathcal{L}^t_{collision}$$

with a time-adaptive weight defined as:

$$\lambda(t) = \min\!\left(\frac{T_{label} - t}{T_{label}}, 0\right)$$

where $T_{label}$ is the label horizon (e.g., latest timestep).

For example, the machine-learned model can be trained using a loss function that includes an imitation term 800 that encourages the machine-learned model to generate synthetic motion predictions 805A-B that imitate ground truth motions 810. To learn from demonstrations, a variational learning objective of a conditional variational auto-encoder can be adapted to optimize the evidence-based lower bound (ELBO) of the log likelihood $\log P(\mathcal{Y}^t|X^t)$ at each timestep $t \leq T_{label}$. By way of example, the imitation loss 800 can include a reconstruction component and a KL divergence component:

$$\mathcal{L}^t_{imitation}\!\left(\mathcal{Y}^t_{posterior}, \mathcal{Y}^t_{GT}\right) = \mathcal{L}^t_{recon} + \beta \cdot \mathcal{L}^t_{KL}$$

$$L^t_{recon} = \sum_a^N \sum_{\tau=t+1}^{t+P} L_\delta\!\left(y^\tau_a - y^\tau_{a,GT}\right)$$

$$L^t_{KL} = KL(q_\phi(Z^t|X^t, \mathcal{Y}^t_{GT})\|p_\gamma(Z^t|X^t))$$

A Huber loss $L_\delta$ can be used for reconstruction and to reweight the KL term with $\beta$.

Additionally or alternatively, the loss function can include a collision term 850 that encourages the machine-learned model to generate synthetic motion predictions 855A-B that do not result in collisions 860A-B. For example, the imitation term 800 can be augmented with an auxiliary common sense term and a time-adaptive multi-task loss can be used to balance the supervision. Through a simulation horizon, the loss function can anneal $\lambda(t)$ to favour supervision from common sense over imitation.

$$\mathcal{L} = \sum_t \lambda(t)\mathcal{L}^t_{imitation} + (1 - \lambda(t))\mathcal{L}^t_{collision}$$

The machine-learned model can be unrolled in two distinct segments during training. First, for $t \leq T_{label}$, the model can be unrolled with posterior samples (e.g., synthetic motion predictions 805A-B) from the model $$\left(\text{e.g., denoted } \mathcal{Y}_{post}^t = f(X^t, Z_{post}^t) \text{ where } Z_{post}^t\right)$$

is conditioned on ground truth future $$\mathcal{Y}_{GT}^t).$$

Subsequently for $T_{label} < t \leq T$, the prior samples (e.g., synthetic motion predictions 855A-B)

$$\left(\text{e.g., denoted } \mathcal{Y}_{prior}^t = f(X^t, Z_{prior}^t)\right)$$

can be used instead. The posterior samples (e.g., synthetic motion predictions 805A-B) can reconstruct the ground truth future 810, whereas prior samples (e.g., synthetic motion predictions 855A-B) can cover diverse possible futures that do not result in collisions 860A-B.

A pair-wise collision loss can be used to design an efficient differentiable relaxation to ease optimization. For example, each object can be approximated with circles (e.g., 5 circles), and the L2 distance can be computed as the distance between centroids of the closest circles of each pair of objects. The loss can be applied on prior samples from the model $\mathcal{Y}_{prior}^t$ to directly regularize $P(\mathcal{Y}^t | X^t)$. The loss can be defined as:

$$\mathcal{L}_{collision}^t\left(\mathcal{Y}_{prior}^t\right) = \frac{1}{N^2} \sum_{i \neq j} \max\left(1, \sum_{\tau = t+1}^{t+P} \mathcal{L}_{pair}\left(y_i^\tau, y_j^\tau\right)\right)$$

$$\mathcal{L}_{pair}\left(y_i^\tau, y_j^\tau\right) = \begin{cases} 1 - \dfrac{d}{r_i + r_j}, & \text{if } d \leq r_i + r_j \\ 0, & \text{otherwise} \end{cases}$$

FIG. 9 is a flowchart of a method 900 for providing synthetic testing data, according to some aspects of the present disclosure. One or more portion(s) of the method 900 can be implemented by a computing system that includes one or more computing devices such as, for example, the computing systems described with reference to the other figures (e.g., system 500, system 600, autonomous platform 105, vehicle computing system 210, operations computing system(s) 290A, remote computing system(s) 290B, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 2, 5, 6, 13, etc.), for example, to provide synthetic testing data discussed herein. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 includes obtaining map data descriptive of an environment and object data descriptive of a plurality of objects within the environment. For example, a computing system can obtain the map data descriptive of the environment and the object data descriptive of the plurality of objects within the environment. The object data can include respective current states of the plurality of objects within the environment.

At 910, the method 900 includes generating context data associated with the plurality of objects within the environment based at least in part on the map data and the object data. For example, the computing system can generate the context data associated with the plurality of objects within the environment based at least in part on the map data and the object data.

At 915, the method 900 includes processing the context data with a machine-learned model to generate a plurality of synthetic motion predictions respectively for the plurality of objects. For example, the computing system can process the context data with the machine-learned model to generate the plurality of synthetic motion predictions respectively for the plurality of objects. The machine-learned model can include an implicit latent variable model that generates a latent variable distribution representing interactions between the plurality of objects within the environment. The plurality of synthetic motion predictions can include one or more synthesized states for the plurality of objects.

At 920, the method 900 includes providing, as an output, synthetic testing data that includes at least a portion of the plurality of synthetic motion predictions respectively for the plurality of objects. For example, the computing system can provide, as an output, synthetic testing data that includes at least the portion of the plurality of synthetic motion predictions respectively for the plurality of objects.

FIG. 10 is a flowchart of a method 1000 for processing context data with a machine-learned model to generate a plurality of synthetic motion predictions respectively for a plurality of objects, according to some aspects of the present disclosure. One or more portion(s) of the method 1000 can be implemented by a computing system that includes one or more computing devices such as, for example, the computing systems described with reference to the other figures (e.g., system 500, system 600, autonomous platform 105, vehicle computing system 210, operations computing system(s) 290A, remote computing system(s) 290B, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1, 2, 5, 6, 13, etc.), for example, to process context data with a machine-learned model to generate a plurality of synthetic motion predictions respectively for a plurality of objects as discussed herein. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

The method 1000 can include a portion of operation 915 of FIG. 9 where the method 900 includes processing context data with a machine-learned model to generate a plurality of synthetic motion predictions respectively for a plurality of objects.

At 1005, the method 1000 includes processing context data with a prior network to generate a latent variable distribution. For example, a computing system can process the context data with the prior network to generate the latent variable distribution. The latent variable distribution can represent interactions between a plurality of objects within an environment. The prior network, for example, can include a graph neural network. For instance, the prior network can be parameterized using a graph neural network (GNN) for encoding to an environment-level latent variable by propagating messages across a fully connected interaction graph with objects as nodes, the latent space can learn to capture not only individual object goals and style, but also multi-agent interactions.

At 1010, the method 1000 includes sampling a plurality of samples from the latent variable distribution generated by the prior network. For example, the computing system can sample the plurality of samples from the latent variable distribution generated by the prior network. For instance, the computing system can explicitly reason about multi-object interaction to sample multiple consistent plans for all objects in the environment in parallel.

At 1015, the method 1000 includes processing the plurality of samples from the latent variable distribution with a decoder network to generate a plurality of synthetic motion predictions respectively for the plurality of objects. For example, the computing system can process the plurality of samples from the latent variable distribution with the decoder network to generate the plurality of synthetic motion predictions respectively for the plurality of objects. The decoder network, for example, can include a graph neural network. For instance, the decoder network can be used to encourage environment latent features to capture all stochasticity and avoid factorizing across time. This can allow the generation of scene-consistent samples of actor plans efficiently in one stage of parallel sampling.

FIG. 11 is a flowchart of method 1100 for running a simulation, according to some aspects of the present disclosure. One or more portion(s) of the method 1100 can be implemented by a computing system that includes one or more computing devices such as, for example, the computing systems described with reference to the other figures (e.g., system 500, system 600, autonomous platform 105, vehicle computing system 210, operations computing system(s) 290A, remote computing system(s) 290B, etc.). Each respective portion of the method 1100 can be performed by any (or any combination) of one or more computing devices. Moreover, one or more portion(s) of the method 1100 can be implemented as an algorithm on the hardware components of the device(s) described herein (e.g., as in FIGS. 1, 2, 5, 6, 13, etc.), for example, to run a simulation as discussed herein. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally, or alternatively, by other systems.

The method 1100 can begin at operation 920 of FIG. 9 where the method 900 includes providing, as an output, synthetic testing data that includes at least a portion of the plurality of synthetic motion predictions respectively for the plurality of objects.

At 1105, the method 1100 includes running a simulation at a respective time step to test an autonomous vehicle control system using the synthetic testing data. For example, a computing system can run the simulation at the respective time step to test the autonomous vehicle control system using the synthetic testing data. This can include, for example, running simulations with a number of dynamic objects configured to move according to a set of diverse motion patterns. The diverse motion patterns can be used to test and/or train an autonomous vehicle control system (and/or one or more machine-learning models thereof) in a simulation setting to accurately identify and react (e.g., by determining an autonomous vehicle motion, etc.) to the set of diverse motion patterns.

At 1110, the method 1100 includes obtaining additional object data descriptive of the plurality of objects within the environment. For example, the computing system can obtain the additional object data descriptive of the plurality of objects within the environment. The additional object data, for example, can be indicative of one or more object states for the plurality of objects at a future time.

At 1115, the method 1100 includes generating additional context data associated with the plurality of objects within the environment based at least in part on the additional object data. For example, the computing system can generate the additional context data associated with the plurality of objects within the environment based at least in part on the additional object data.

At 1120, the method 1100 includes processing the additional context data with the machine-learned model to generate an additional plurality of synthetic motion predictions respectively for the plurality of objects at a next time step. For example, the computing system can process the additional context data with the machine-learned model to generate the additional plurality of synthetic motion predictions respectively for the plurality of objects at the next time step. The additional context data, for example, can be generated using previously stored map data in the manner described with reference to FIG. 9.

At 1125, the method 1100 includes providing, as an output, the additional synthetic testing data that includes at least a portion of the additional plurality of synthetic motion predictions respectively for the plurality of objects. For example, the computing system can provide, as the output, the additional synthetic testing data that includes at least the portion of the additional plurality of synthetic motion predictions respectively for the plurality of objects. The additional synthetic testing data, for example, can include a plurality of synthetic states for the plurality of objects at one or more future times.

The method 1100 can return to operation 1105 where the method 1100 can include running the simulation at another respective time step to test the autonomous vehicle control system using the additional synthetic testing data. By way of example, the computing system can move the plurality of objects within the simulation according to the plurality of synthetic states for the plurality of objects at the one or more future times.

FIG. 12 is a flowchart of method 1200 for training a machine-learned model, according to some aspects of the present disclosure. One or more portion(s) of the method 1200 can be implemented by a computing system that includes one or more computing devices such as, for example, the computing systems described with reference to the other figures (e.g., system 500, system 600, autonomous platform 105, vehicle computing system 210, operations computing system(s) 290A, remote computing system(s) 290B, etc.). Each respective portion of the method 1200 can be performed by any (or any combination) of one or more computing devices. Moreover, one or more portion(s) of the method 1200 can be implemented as an algorithm on the hardware components of the device(s) described herein (e.g., as in FIGS. 1, 2, 5, 6, 13, etc.), for example, to train the machine-learned model as discussed herein. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of method 1100 can be performed additionally, or alternatively, by other systems.

At 1205, the method 1200 includes generating a training data set for training a machine-learned model. For example, a computing system can generate a training data set for training a machine-learned model. As one example, the training data set can include a large-scale autonomous dataset containing more than one million frames collected by a fleet of vehicles over several cities in North America with a sixty-four-beam, roof-mounted light-detection and ranging system. The training data set can be labeled with a plurality of three-dimensional bounding box tracks. The training dataset can include six thousand five hundred snippets in total, each 25 seconds long.

At 1210, the method 1200 includes generating one or more training examples using the training data set and synthetic testing data. For example, the computing system can generate one or more training examples using the training data set and synthetic testing data. The training examples, for instance, can include a plurality of dynamic objects positioned within an environment depicted by one or more frames of the training data set according to one or more synthetic motion predictions respectively generated for the plurality of objects.

At 1215, the method 1200 includes performing one or more machine-learning algorithms on the one or more training examples. For example, the computing system can perform one or more machine-learning algorithms on the one or more training examples. The one or more machine-learning algorithms can include, for example, one or more of the machine-learning algorithms described herein. By way of example, the one or more machine-learning algorithms can be performed on the one or more training examples to generate training synthetic testing data. The training synthetic testing data can be compared to the synthetic testing data to determine an accuracy of the training synthetic testing data. As another example, the one or more machine-learning algorithms can be performed on the one or more training examples to generate one or more motion forecasts for the objects, generate a motion plan for an autonomous vehicle, and/or to perform any other autonomy function for an autonomous vehicle. The synthetic testing data can be used to score one or more outputs of the one or more machine-learning algorithms.

At 1220, the method 1200 includes generating an imitation loss based on the performance of the one or more machine-learning algorithms. For example, the computing system can generate the imitation loss based on the performance of the one or more machine-learning algorithms in the event that the one or more machine-learning algorithms include those described herein for generating the training synthetic testing data.

At 1225, the method 1200 includes generating a collision loss based on the performance of the one or more machine-learning algorithms. For example, the computing system can generate the collision loss based on the performance of the one or more machine-learning algorithms in the event that the one or more machine-learning algorithms include those described herein for generating the training synthetic testing data.

At 1230, the method 1200 includes modifying at least one parameter of at least a portion of the machine-learned model based on the imitation loss and the collision loss. For example, the computing system can modify the at least one parameter of at least the portion of the machine-learned model based on the imitation loss and the collision loss. For example, the one or more machine-learned models can be trained using a loss function. The loss function can include an imitation term that encourages the one or more machine-learned models to generate synthetic motion predictions that imitate ground truth motions and a collision term that encourages the one or more machine-learned models to generate synthetic motion predictions that do not result in collisions. At least one parameter of at least a portion of the one or more machine-learning algorithms can be modified to improve the generation of synthetic motion predictions that imitate ground truth motions and do not result in collisions.

Figure 13:
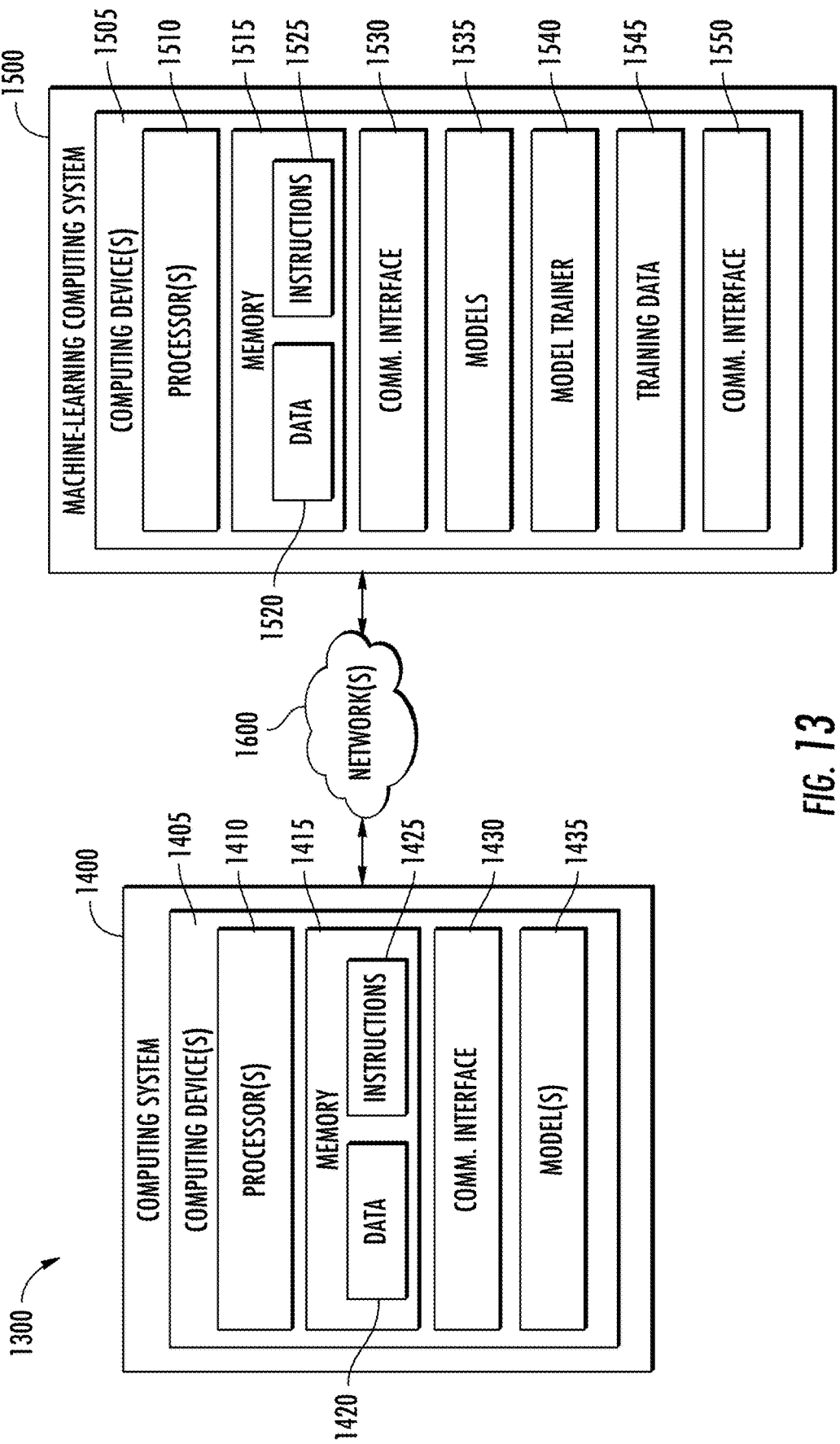
FIG. 13 is a block diagram of a computing system, according to some implementations of the present disclosure.

FIG. 13 is a block diagram of an example computing system 1300, according to some embodiments of the present disclosure. The example system 1300 includes a computing system 1400 and a machine-learning computing system 1500 that are communicatively coupled over one or more networks 1600.

In some implementations, the computing system 1400 can perform one or more observation tasks such as, for example, by obtaining sensor data (e.g., two-dimensional, three-dimensional, etc.) associated with a dynamic object. In some implementations, the computing system 1400 can be included in an autonomous platform. For example, the computing system 1400 can be on-board an autonomous vehicle. In other implementations, the computing system 1400 is not located on-board an autonomous platform. The computing system 1400 can include one or more distinct physical computing devices 1405.

The computing system 1400 (or one or more computing device(s) 1405 thereof) can include one or more processors 1410 and a memory 1415. The one or more processors 1410 can be any suitable processing device (e.g., a processor core, a microprocessor, an ASIC, a FPGA, a controller, a micro-controller, etc.) and can be one processor or a plurality of processors that are operatively connected. The memory 1415 can include one or more non-transitory computer-readable storage media, such as RAM, ROM, EEPROM, EPROM, one or more memory devices, flash memory devices, etc., and combinations thereof.

The memory 1415 can store information that can be accessed by the one or more processors 1410. For instance, the memory 1415 (e.g., one or more non-transitory computer-readable storage mediums, memory devices) can store data 1420 that can be obtained, received, accessed, written, manipulated, created, or stored. The data 1420 can include, for instance, sensor data, two-dimensional data, three-dimensional, image data, LiDAR data, object data, map data, simulation data (e.g., synthetic testing data, etc.) or any other data or information described herein. In some implementations, the computing system 1400 can obtain data from one or more memory device(s) that are remote from the computing system 1400.

The memory 1415 can also store computer-readable instructions 1425 that can be executed by the one or more processors 1410. The instructions 1425 can be software written in any suitable programming language or can be implemented in hardware. Additionally, or alternatively, the instructions 1425 can be executed in logically or virtually separate threads on processor(s) 1410.

For example, the memory 1415 can store instructions 1425 that when executed by the one or more processors 1410 cause the one or more processors 1410 (the computing system 1400) to perform any of the operations, functions, or methods/processes described herein, including, for example, obtaining map data, generating context data, processing the context data, providing synthetic data, etc.

According to an aspect of the present disclosure, the computing system 1400 can store or include one or more machine-learned models 1435. As examples, the machine-learned models 1435 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1400 can receive the one or more machine-learned models 1435 from the machine-learning computing system 1500 over network(s) 1600 and can store the one or more machine-learned models 1435 in the memory 1415. The computing system 1400 can then use or otherwise implement the one or more machine-learned models 1435 (e.g., by processor(s) 1410). In particular, the computing system 1400 can implement the machine-learned model(s) 1435 to generate synthetic motion predictions for objects, etc.

The machine learning computing system 1500 can include one or more computing devices 1505. The machine learning computing system 1500 can include one or more processors 1510 and a memory 1515. The one or more processors 1510 can be any suitable processing device (e.g., a processor core, a microprocessor, an ASIC, a FPGA, a controller, a microcontroller, etc.) and can be one processor or a plurality of processors that are operatively connected. The memory 1515 can include one or more non-transitory computer-readable storage media, such as RAM, ROM, EEPROM, EPROM, one or more memory devices, flash memory devices, etc., and combinations thereof.

The memory 1515 can store information that can be accessed by the one or more processors 1510. For instance, the memory 1515 (e.g., one or more non-transitory computer-readable storage mediums, memory devices) can store data 1520 that can be obtained, received, accessed, written, manipulated, created, or stored. The data 1520 can include, for instance, map data, context data, data associated with models, or any other data or information described herein. In some implementations, the machine learning computing system 1500 can obtain data from one or more memory device(s) that are remote from the machine learning computing system 1500.

The memory 1515 can also store computer-readable instructions 1525 that can be executed by the one or more processors 1510. The instructions 1525 can be software written in any suitable programming language or can be implemented in hardware. Additionally, or alternatively, the instructions 1525 can be executed in logically or virtually separate threads on processor(s) 1510.

For example, the memory 1515 can store instructions 1525 that when executed by the one or more processors 1510 cause the one or more processors 1510 (the computing system) to perform any of the operations or functions described herein, including, for example, training a machine-learned multi-agent motion synthesis model, generating synthetic testing data, etc.

In some implementations, the machine learning computing system 1500 includes one or more server computing devices. If the machine learning computing system 1500 includes multiple server computing devices, such server computing devices can operate according to various computing architectures, including, for example, sequential computing architectures, parallel computing architectures, or some combination thereof.

In addition, or alternatively to the model(s) 1435 at the computing system 1400, the machine learning computing system 1500 can include one or more machine-learned models 1535. As examples, the machine-learned models 1535 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1500 or the computing system 1400 can train the machine-learned models 1435 or 1535 through use of a model trainer 1540. The model trainer 1540 can train the machine-learned models 1435 or 1535 using one or more training or learning algorithms. One example training technique is backwards propagation of errors. In some implementations, the model trainer 1540 can perform supervised training techniques using a set of labeled training data. In other implementations, the model trainer 1540 can perform unsupervised training techniques using a set of unlabeled training data.

The computing system 1400 and the machine learning computing system 1500 can each include a communication interface 1430 and 1550, respectively. The communication interfaces 1430/1550 can be used to communicate with one or more systems or devices, including systems or devices that are remotely located from the computing system 1400 and the machine learning computing system 1500. A communication interface 1430/1550 can include any circuits, components, software, etc. for communicating with one or more networks (e.g., 1400). In some implementations, a communication interface 1430/1550 can include, for example, one or more of a communications controller, receiver, transceiver, transmitter, port, conductors, software or hardware for communicating data.

The network(s) 1600 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1600 can be accomplished, for instance, through a network interface using any type of protocol, protection scheme, encoding, format, packaging, etc.

FIG. 13 illustrates one example system 1500 that can be used to implement the present disclosure. Other systems can be used as well. For example, in some implementations, the computing system 1400 can include the model trainer 1540 and the training dataset 1545. In such implementations, the machine-learned models 1535 can be both trained and used locally at the computing system 1400. As another example, in some implementations, the computing system 1400 is not connected to other computing systems.

In addition, components illustrated or discussed as being included in one of the computing systems 1400 or 1500 can instead be included in another of the computing systems 1400 or 1500. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

What is claimed is:

1. A computer-implemented method for generating synthetic testing data for autonomous vehicles, the method comprising:

(a) obtaining object data descriptive of a plurality of objects within an environment, wherein the object data comprises respective current states of the plurality of objects within the environment;

(b) generating context data associated with the plurality of objects within the environment based at least in part on the object data;

(c) processing the context data with a machine-learned multi-agent behavior model to simulate traffic in the environment to generate a plurality of synthetic motion predictions respectively for the plurality of objects, wherein the plurality of synthetic motion predictions comprise one or more synthesized states for the plurality of objects, wherein the machine-learned model has been trained with a multi-task loss to jointly generate the plurality of synthetic motion predictions; and (d) providing, as an output, synthetic testing data that includes at least a portion of the plurality of synthetic motion predictions respectively for the plurality of objects.

2. The computer-implemented method of claim 1, wherein the multi-task loss includes an imitation term that encourages the machine-learned model to generate the plurality of synthetic motion predictions to imitate ground truth motions.

3. The computer-implemented method of claim 1, wherein the machine-learned model is configured to parameterize a joint actor policy that generates plans for the plurality of objects in a scene jointly.

4. The computer-implemented method of claim 3, the machine-learned model having been trained by unrolling the joint actor policy for closed-loop training.

5. The computer-implemented method of claim 4, wherein the closed-loop training comprises determining a loss at multiple respective time steps.

6. The computer-implemented method of claim 1, wherein the machine-learned model comprises a generative model.

7. The computer-implemented method of claim 1, wherein the machine-learned model comprises an implicit latent variable model.

8. The computer-implemented method of claim 7, wherein the implicit latent variable model is configured to generate a latent variable distribution representing object maneuvers or interactions among the plurality of objects within the environment.

9. The computer-implemented method of claim 8, wherein the interactions among the plurality of objects comprise one or more of yielding actions, merging actions, or passing actions.

10. The computer-implemented method of claim 8, wherein the object maneuvers comprise one or more of a three-point turn, a U-turn, or a maneuver that does not comply with traffic rules.

11. The computer-implemented method of claim 1, further comprising:
(e) running a simulation to test an autonomous vehicle control system using the synthetic testing data, wherein during at least a portion of the simulation, a simulated object moves within a simulated environment in accordance with at least one synthetic motion prediction of the plurality of synthetic motion predictions.

12. A computing system comprising:
one or more processors; and
one or more computer-readable medium storing instructions that when executed by the one or more processors cause the computing system to perform operations, the operations comprising:
(a) obtaining object data descriptive of a plurality of objects within an environment, wherein the object data comprises respective current states of the plurality of objects within the environment;
(b) generating context data associated with the plurality of objects within the environment based at least in part on the object data;
(c) processing the context data with a machine-learned multi-agent behavior model to simulate traffic in the environment to generate a plurality of synthetic motion predictions respectively for the plurality of objects, wherein the plurality of synthetic motion predictions comprise one or more synthesized states for the plurality of objects, wherein the machine-learned model has been trained with a multi-task loss to jointly generate the plurality of synthetic motion predictions; and
(d) providing, as an output, synthetic testing data that includes at least a portion of the plurality of synthetic motion predictions respectively for the plurality of objects.

13. The computing system of claim 12, wherein the multi-task loss includes an imitation term that encourages the machine-learned model to generate the plurality of synthetic motion predictions to imitate ground truth motions.

14. The computing system of claim 12, wherein the machine-learned model is configured to parameterize a joint actor policy that generates plans for the plurality of objects in a scene jointly.

15. The computing system of claim 14, the machine-learned model having been trained by unrolling the joint actor policy for closed-loop training.

16. The computing system of claim 12, wherein the machine-learned model comprises a generative model.

17. The computing system of claim 12, wherein the machine-learned model comprises an implicit latent variable model.

18. The computing system of claim 17, wherein the implicit latent variable model is configured to generate a latent variable distribution representing object maneuvers or interactions among the plurality of objects within the environment.

19. The computing system of claim 12, further comprising: (e) training one or more machine learning models of an autonomous vehicle control system via performance of machine learning algorithms on one or more training examples comprising the synthetic testing data.

20. One or more non-transitory computer-readable media that store: one or more machine-learned models, wherein the one or more machine-learned models have been learned via performance of machine learning algorithms on one or more training examples comprising synthetic testing data, the synthetic testing data having been generated by performance of operations, the operations comprising:
(a) obtaining object data descriptive of a plurality of objects within an environment, wherein the object data comprises respective current states of the plurality of objects within the environment;
(b) generating context data associated with the plurality of objects within the environment based at least in part on the object data;
(c) processing the context data with a machine-learned multi-agent behavior model to simulate traffic in the environment to generate a plurality of synthetic motion predictions respectively for the plurality of objects, wherein the plurality of synthetic motion predictions comprise one or more synthesized states for the plurality of objects, wherein the machine-learned model has been trained with a multi-task loss to jointly generate the plurality of synthetic motion predictions; and
(d) providing, as an output, synthetic testing data that includes at least a portion of the plurality of synthetic motion predictions respectively for the plurality of objects.

* * * * *